(12) United States Patent
Hithersay et al.

(10) Patent No.: US 12,522,398 B2
(45) Date of Patent: Jan. 13, 2026

(54) TRAYS FOR FOOD PRODUCTS AND RELATED SYSTEMS AND METHODS

(71) Applicant: Graphic Packaging International, LLC, Atlanta, GA (US)

(72) Inventors: Elliot Hithersay, Derbyshire (GB); Jamie Skipper, Leicester (GB); Christopher Tart, Leicestershire (GB)

(73) Assignee: Graphic Packaging International, LLC, Atlanta, GA (US)

( * ) Notice: Subject to any disclaimer, the term of this patent is extended or adjusted under 35 U.S.C. 154(b) by 3 days.

(21) Appl. No.: 18/386,280

(22) Filed: Nov. 2, 2023

(65) Prior Publication Data

US 2024/0150067 A1 May 9, 2024

Related U.S. Application Data

(60) Provisional application No. 63/464,781, filed on May 8, 2023, provisional application No. 63/455,485, filed
(Continued)

(51) Int. Cl.
*B65D 5/32* (2006.01)
*B31B 50/26* (2017.01)
(Continued)

(52) U.S. Cl.
CPC ............ *B65D 5/321* (2013.01); *B31B 50/262* (2017.08); *B31B 50/62* (2017.08); *B65D 5/4266* (2013.01); *B31B 2105/00* (2017.08)

(58) Field of Classification Search
CPC .... B65D 5/321; B65D 5/4266; B65D 5/2047; B65D 5/2033; B65D 5/246; B65D 5/4279; B65D 5/566; B65D 1/34
(Continued)

(56) References Cited

U.S. PATENT DOCUMENTS 2,334,805 A * 11/1943 Barbieri ................ B65D 1/34
229/4.5
3,224,163 A  12/1965 Ray, II
(Continued)

FOREIGN PATENT DOCUMENTS

CA       2988665 C     6/2020
DE       19654230      7/1998
(Continued)

OTHER PUBLICATIONS

International Search Report and Written Opinion for PCT/US2023/036639 dated Mar. 4, 2024.
(Continued)

*Primary Examiner* — Christopher R Demeree
(74) *Attorney, Agent, or Firm* — Andrew N. Claerbout; FisherBroyles, LLC

(57) ABSTRACT

A tray for holding one or more food products, the tray including a first portion, the first portion including a plurality of panels comprising a central panel and a plurality of lower side panels foldably connected to the central panel. The tray further includes a second portion engaged with the first portion, the second portion including a plurality of panels comprising flange panel and a plurality of upper side panels foldably connected to the flange panel, the plurality of upper side panels and the plurality of lower side panels are attached to form a plurality of sidewalls of the tray.

34 Claims, 16 Drawing Sheets

Related U.S. Application Data on Mar. 29, 2023, provisional application No. 63/422,625, filed on Nov. 4, 2022.

(51) Int. Cl.
  *B31B 50/62* (2017.01)
  *B31B 105/00* (2017.01)
  *B65D 5/42* (2006.01)

(58) Field of Classification Search
  USPC .................................. 229/108, 109, 110, 113
  See application file for complete search history.

(56) References Cited

U.S. PATENT DOCUMENTS

| | | | |
|---|---|---|---|
| 3,401,498 | A | 9/1968 | Garvin |
| 3,823,054 | A | 7/1974 | Balzer et al. |
| 5,351,879 | A | 10/1994 | Liu et al. |
| 5,484,052 | A | 1/1996 | Pawloski |
| D382,230 | S | 8/1997 | Weder |
| 5,921,465 | A * | 7/1999 | Garton .................. B65D 5/326 |
| | | | 229/117.06 |
| 6,237,845 | B1 | 5/2001 | Hashimoto |
| D482,276 | S | 11/2003 | Wang |
| 8,297,437 | B2 | 10/2012 | Smalley et al. |
| 8,740,051 | B2 | 6/2014 | Gonzalez |
| 9,376,231 | B2 | 6/2016 | Pinkstone |
| 9,463,896 | B2 | 10/2016 | Fitzwater |
| 10,173,805 | B2 | 1/2019 | Waddington |
| 10,214,315 | B2 | 2/2019 | Oliveira |
| 10,214,334 | B2 | 2/2019 | Jones et al. |
| 10,232,973 | B2 | 3/2019 | Burke |
| 10,689,147 | B2 * | 6/2020 | Nikolic ............... B65D 5/2033 |
| 11,142,383 | B2 | 10/2021 | Thompson |
| 11,434,038 | B2 * | 9/2022 | Tye .......................... B65D 5/20 |
| 11,603,231 | B2 | 3/2023 | Oliveira et al. |
| 11,697,537 | B2 | 7/2023 | Holley, Jr. |
| D1,005,100 | S | 11/2023 | Mondini |
| 11,827,430 | B2 * | 11/2023 | Brink ................. B65D 77/2024 |
| 11,932,467 | B2 | 3/2024 | Ackroyd |
| D1,042,118 | S | 9/2024 | Hithersay |
| D1,042,122 | S | 9/2024 | Brink |
| D1,062,459 | S | 2/2025 | Brink |
| 2012/0292226 | A1 | 11/2012 | Hilbish |
| 2016/0304226 | A1 | 10/2016 | Rossini |
| 2022/0009669 | A1 | 1/2022 | Mack |
| 2024/0150067 | A1 | 5/2024 | Hithersay et al. |
| 2024/0239580 | A1 | 7/2024 | Ahumada |
| 2024/0286790 | A1 | 8/2024 | Kavanagh et al. |
| 2024/0359858 | A1 | 10/2024 | Smith |
| 2025/0058928 | A1 | 2/2025 | Cook et al. |

FOREIGN PATENT DOCUMENTS

| | | |
|---|---|---|
| DE | 10111232 | 9/2002 |
| EM | 8904924 | 3/2022 |
| EP | 2441697 | 8/2014 |
| EP | 3604154 | 2/2020 |
| EP | 3725492 | 10/2020 |
| EP | 3 988 463 A1 | 4/2022 |
| FR | 2975081 A1 | 11/2012 |
| JP | 2001-096644 A | 4/2001 |
| JP | 2006-290368 A | 10/2006 |
| RU | 2566318 C2 | 10/2015 |
| WO | WO 98/28195 A1 | 7/1988 |
| WO | WO 99/67143 | 12/1999 |
| WO | WO 2012/049005 A1 | 4/2012 |
| WO | WO 2018/042210 A1 | 3/2018 |
| WO | WO 2020/033350 | 2/2020 |
| WO | WO 2023/283293 A1 | 1/2023 |
| WO | WO 2024/097318 A1 | 5/2024 |

OTHER PUBLICATIONS

PaperSeal™ Shape Tray for Ready-to-Eat Food. Date first available: Feb. 13, 2023. site visited: Aug. 28, 2025. Available online: https://www.graphicpkg.com/products/paperseal-shape-tray/ (Year: 2023).
PaperSeal™ Shape Tray for Ready-to-Eat Food. Date first available: Feb. 13, 2023. Site visited: May 6, 2025. Available online: https://www.graphicpkg.com/products/paperseal-shape-tray/ (Year: 2023).
Graphic Packaging adds PaperSeal™ Shape. Date first available: Feb. 15, 2023. Site visited: May 6, 2025. Available online: https://www.paperadvance.com/sciences-innovations/paper-advancement/graphic-packaging-adds-paperseal-shape-to-multi-award-winning-tray-range.html (Year: 2023).

\* cited by examiner

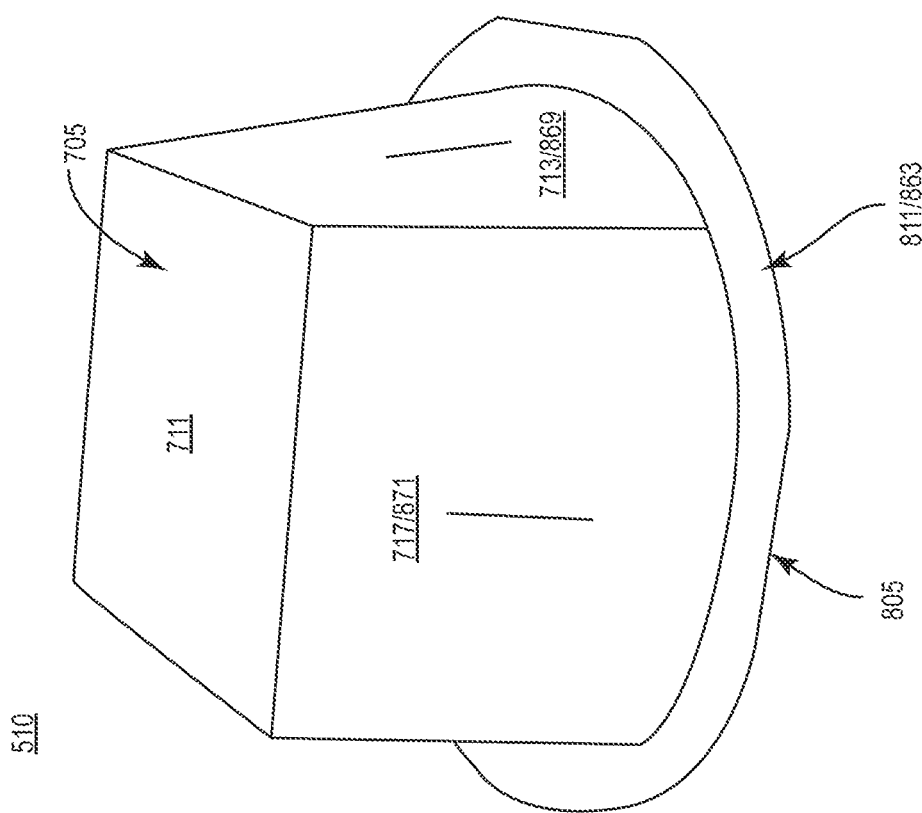

TRAYS FOR FOOD PRODUCTS AND RELATED SYSTEMS AND METHODS

CROSS-REFERENCE TO RELATED APPLICATIONS

The present application claims the benefit of each of U.S. Provisional Patent Application No. 63/422,625, filed on Nov. 4, 2022, U.S. Provisional Patent Application No. 63/455,485, filed on Mar. 29, 2023, and U.S. Provisional Patent Application No. 63/464,781, filed on May 8, 2023.

INCORPORATION BY REFERENCE

The entire disclosures of each of U.S. Provisional Patent Application No. 63/422,625, filed on Nov. 4, 2022, U.S. Provisional Patent Application No. 63/455,485, filed on Mar. 29, 2023, U.S. Provisional Patent Application No. 63/464,781, filed on May 8, 2023, and U.S. Design patent application No. 29/906,128, filed on Oct. 21, 2023, are hereby incorporated by reference for all purposes as if presented herein in their entireties.

BACKGROUND OF THE DISCLOSURE

The present disclosure relates to blanks, containers, trays, constructs, and various features and methods for forming a container from a blank. In some embodiments, the present disclosure relates to trays formed from multiple cooperating portions.

SUMMARY OF THE DISCLOSURE

According to one aspect, the disclosure is generally directed to a tray for holding one or more food products, the tray comprising a first portion, the first portion comprising a plurality of panels comprising a central panel and a plurality of lower side panels foldably connected to the central panel. The tray further comprises a second portion engaged with the first portion, the second portion comprising a plurality of panels comprising flange panel and a plurality of upper side panels foldably connected to the flange panel, the plurality of upper side panels and the plurality of lower side panels are attached to form a plurality of sidewalls of the tray.

According to another aspect, the disclosure is generally directed to a combination of blanks for forming a tray for holding one or more food products, the combination comprising a first blank, the first blank comprising a plurality of panels comprising a central panel and a plurality of lower side panels foldably connected to the central panel. The combination further comprises and a second blank for being engaged with the first blank when the tray is formed from the combination of blanks, the second blank comprising a plurality of panels comprising flange panel and a plurality of upper side panels foldably connected to the flange panel, the plurality of upper side panels and the plurality of lower side panels are for being attached to form a plurality of sidewalls of the tray formed from the combination of blanks.

According to another aspect, the disclosure is generally directed to a method of forming a tray for holding one or more food products, the method comprising obtaining a first blank, the first blank comprising a plurality of panels comprising a central panel and a plurality of lower side panels foldably connected to the central panel, and obtaining a second blank, the second blank comprising a plurality of panels comprising flange panel and a plurality of upper side panels foldably connected to the flange panel. The method further comprises forming a first portion of the tray from the first blank, forming a second portion of the tray from the first blank, and attaching the plurality of upper side panels and the plurality of lower side panels to form a plurality of sidewalls of the tray.

Those skilled in the art will appreciate the above stated advantages and other advantages and benefits of various additional embodiments reading the following detailed description of the embodiments with reference to the below-listed drawing figures.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

FIG. 16 is another perspective view of the tray of FIG. 15.

Corresponding parts are designated by corresponding reference numbers throughout the drawings.

DETAILED DESCRIPTION OF THE EXEMPLARY EMBODIMENTS

Various aspects of the disclosure may be understood further by referring to the figures. For purposes of simplicity, like numerals may be used to describe like features. It will be understood that where a plurality of similar features are depicted, not all of such features necessarily are labeled on each figure. It also will be understood that the various components used to form the constructs may be interchanged. Thus, while only certain combinations are illustrated herein, numerous other combinations and configurations are contemplated hereby.

Trays according to the present disclosure can accommodate articles of numerous different shapes. For the purpose of illustration and not for the purpose of limiting the scope of the disclosure, the following detailed description describes articles such as food products at least partially disposed upon or within the construct embodiments.

The articles can include food products such as cereal, granola, trail mix, candy, pasta, dried fruits, nuts, produce (e.g., fruit, vegetables, salad, etc.) or any other food product such as liquid or powdered food or beverage products. In other embodiments, the articles could be nonfood productions (e.g., detergent, cat litter, etc.) without departing from the disclosure.

In this specification, the terms "inner," "interior," "outer," "exterior," "lower," "bottom," "upper," and "top" indicate orientations determined in relation to fully erected and upright trays.

As described herein, trays may be formed by multiple overlapping panels, end flaps, and/or other portions of blanks. Such panels, end flaps, and/or other portions of the blanks can be designated in relative terms to one another, e.g., "first", "second", "third", etc., in sequential or non-sequential reference, without departing from the disclosure.

Figure 1:
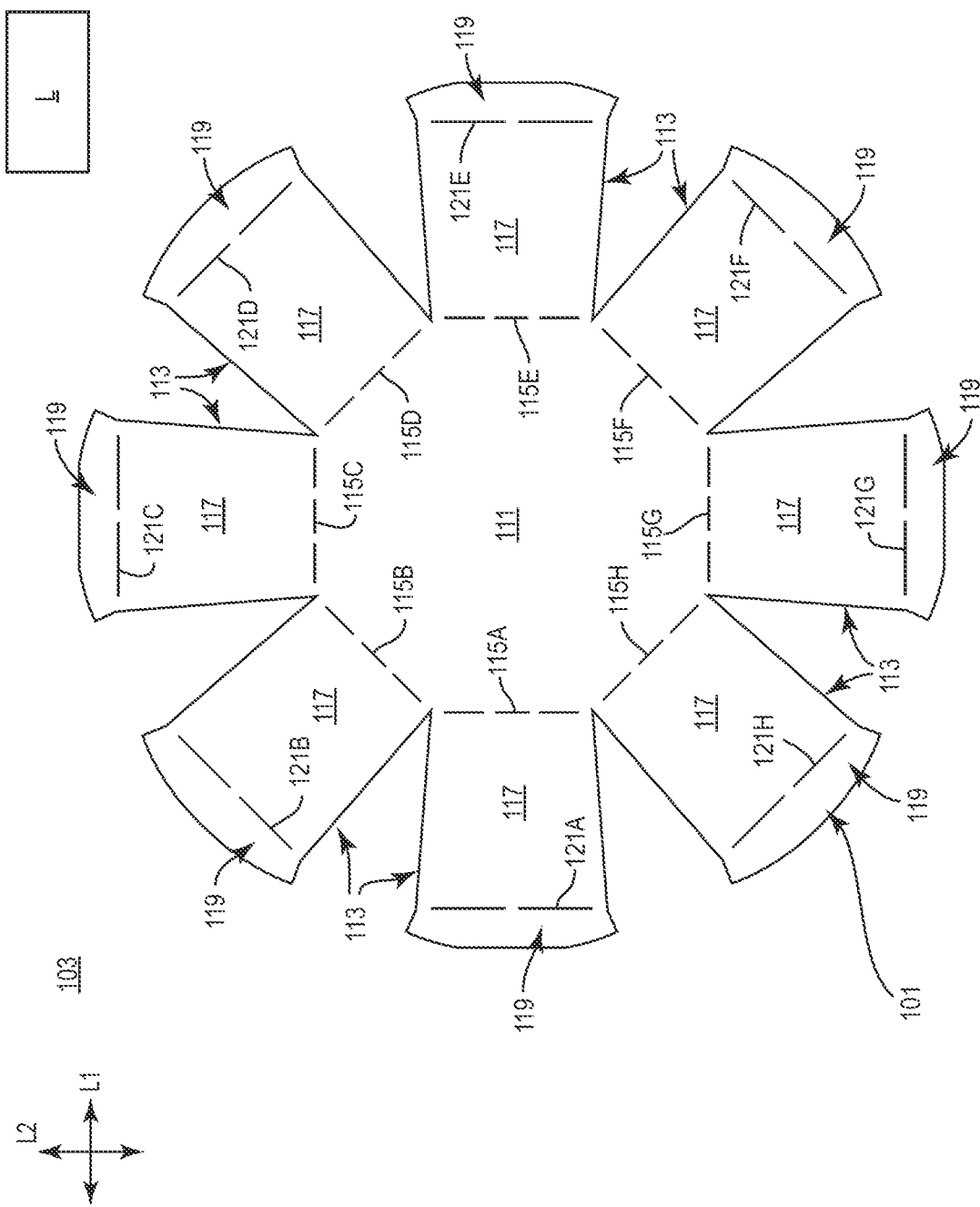
FIG. 1 is a plan view of a first blank for at least partially forming a tray for holding food products according to a first exemplary embodiment of the disclosure.

FIG. 1 illustrates an exterior surface 101 of a base blank or first blank 103 for forming a base portion or first tray portion 105 of a tray 110 according to a first exemplary embodiment of the disclosure.

As shown, the blank 103 has A longitudinal direction L1 and a lateral direction L2. In the illustrated embodiment, the blank 103 has a base panel or bottom panel or central panel 111. The blank 103 can also include a plurality of lower side end flaps or lower side panels 113 foldably connected to the central panel 111 at a respective lateral fold line 115A, oblique fold line 115B, longitudinal fold line 115C, oblique fold line 115D, lateral fold line 115E, oblique fold line 115F, longitudinal fold line 115G, and oblique fold line 115H.

Each side panel 113, as shown, can include a respective base portion 117 and a respective distal portion 119 foldably connected to the respective base portion 117 at a respective lateral fold line 121A, oblique fold line 121B, longitudinal fold line 121C, oblique fold line 121D, lateral fold line 121E, oblique fold line 121F, longitudinal fold line 121G, and oblique fold line 121H.

While the central panel 111 is illustrated as having a generally octagonal configuration with eight side panels foldably connected thereto, it will be understood that the central panel 111 can have a different configuration with a correspondingly different number of side panels foldably connected thereto without departing from the disclosure.

Figure 2:
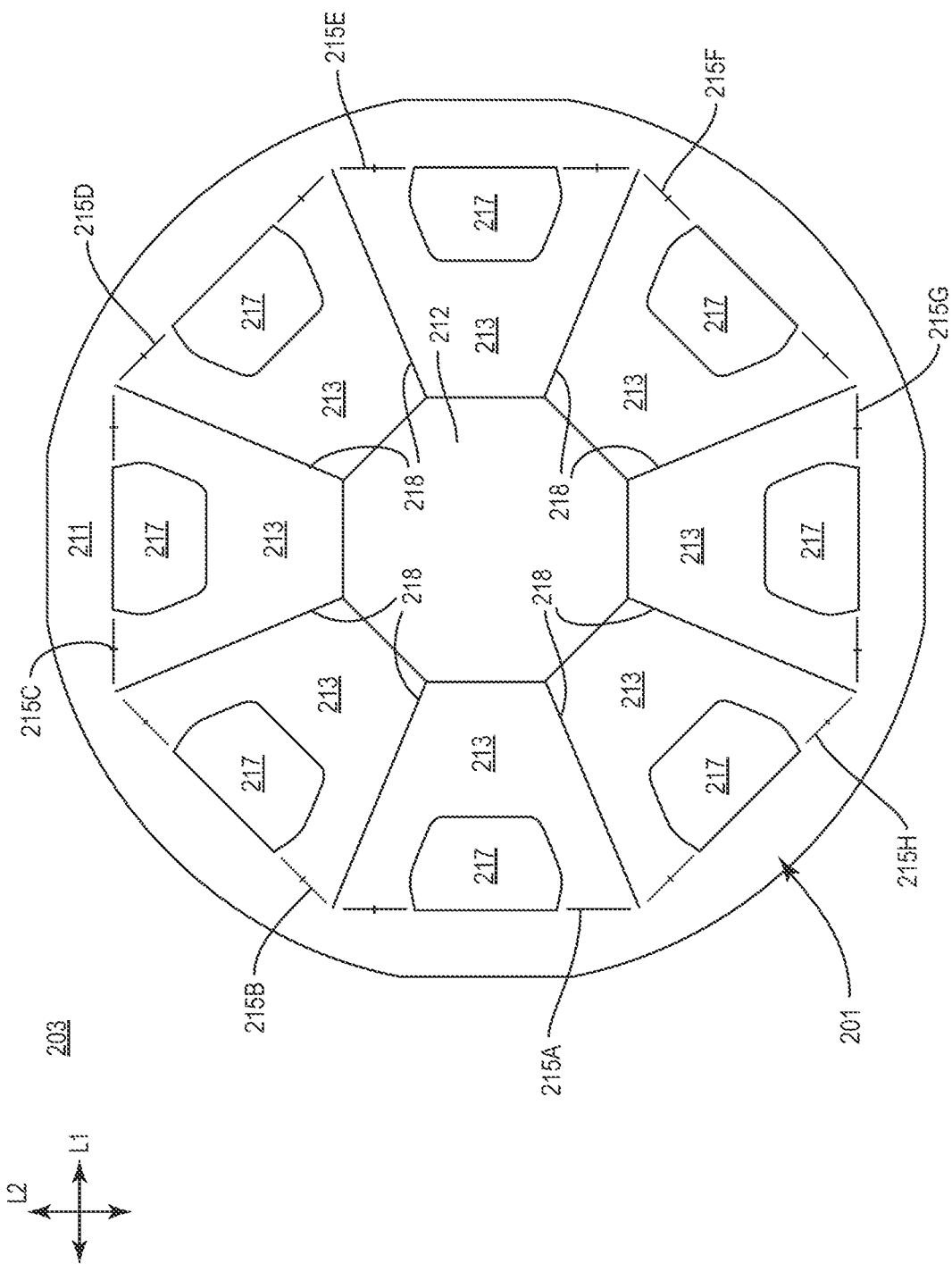
FIG. 2 is a plan view of a second blank for at least partially forming a tray for holding food products according to the first exemplary embodiment of the disclosure.

Turning to FIG. 2, an exterior surface 201 of a crown blank or second blank 203 for forming a crown portion 205 or second portion 205 of the tray 110 is illustrated.

As shown, the blank 203 can have the longitudinal axis L1, the lateral axis L2, and a top panel or flange panel 211 generally forming a perimeter of the blank 203 so as to extend at least partially around a central opening 212 into which a plurality of panels of the blank 203 and second portion 205/tray 110 extend. As shown, the flange panel 211 can have an outer perimeter length greater than that of the central panel 111.

The blank 203 can also include a plurality of upper side end flaps or upper side panels 213 foldably connected to the flange panel 211 at a respective lateral fold line 215A, oblique fold line 215B, longitudinal fold line 215C, oblique fold line 215D, lateral fold line 215E, oblique fold line 215F, longitudinal fold line 215G, and oblique fold line 215H.

In the illustrated embodiment, each upper side panel 213 can have a generally trapezoidal configuration and include an aperture 217 at least partially formed therein and which can at least partially interrupt the respective fold lines 215A, 215B, 215C, 215D, 215E, 215F, 215G, 215H. In some embodiments, one or more of the apertures 217 can be configured for at least partially receiving one or more machine components in the course of formation of the tray 110 and/or for providing visibility to components of the tray underlapped behind the lower side panels 213.

As also shown, adjacent lower upper panels 213 can be at least partially separable from one another at respective oblique cuts 218 that extend to the flange panel 211.

Figure 4:
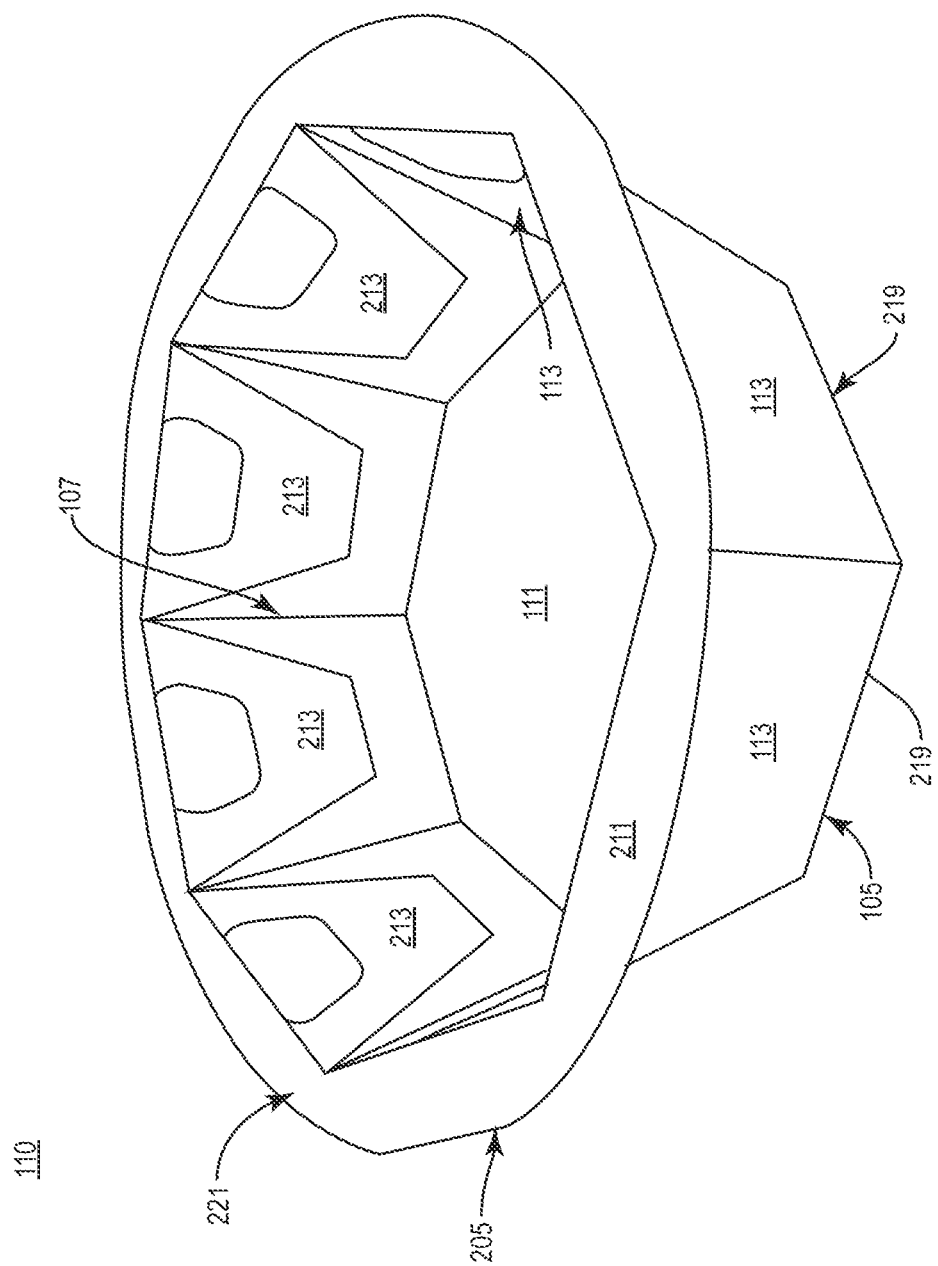
FIG. 4 is a perspective view of a tray formed from the blanks of FIG. 1 and FIG. 2 according to the first exemplary embodiment of the disclosure.
Figure 5:
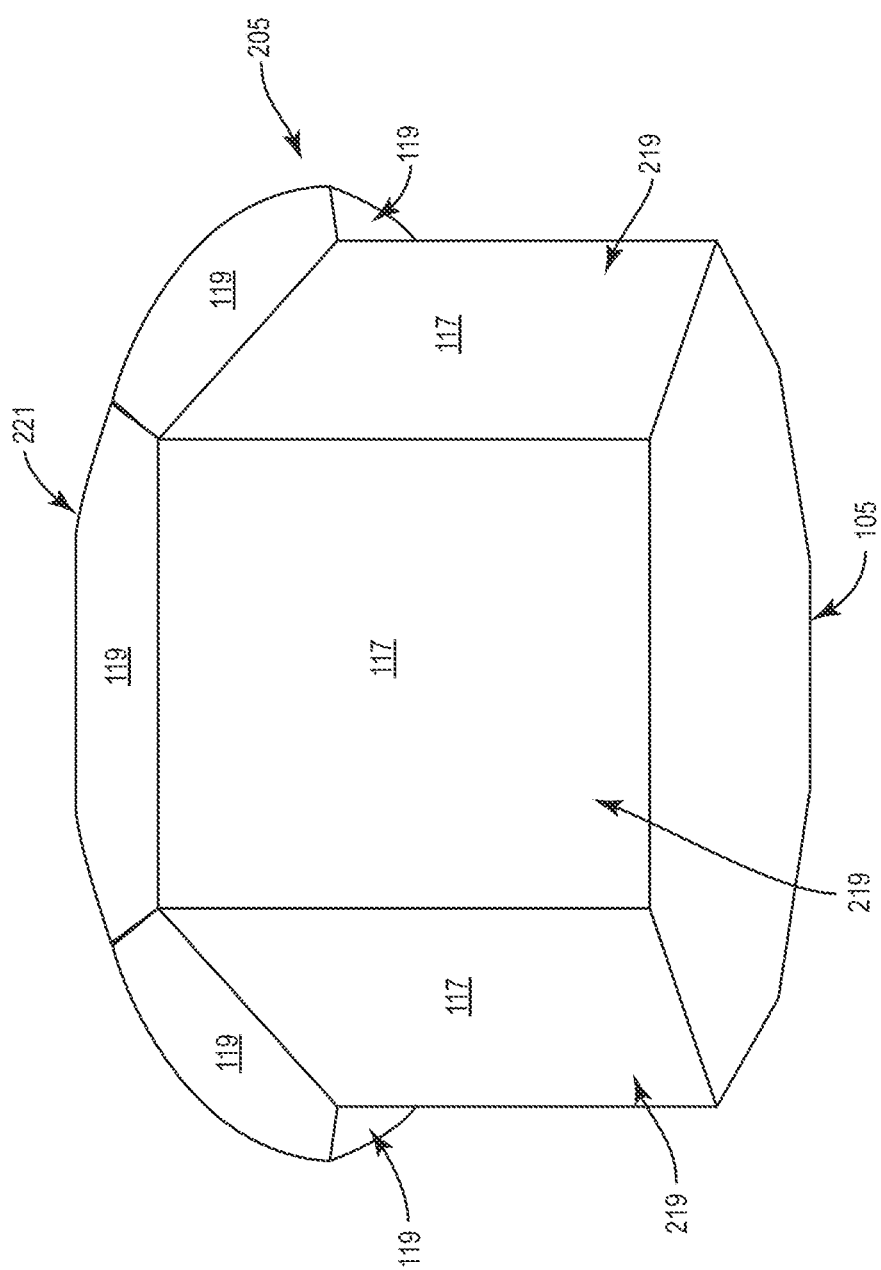
FIG. 5 is another perspective view of the tray of FIG. 4.

With additional reference to FIGS. 3-5, formation of the tray 110 from the cooperation of the first blank 103 and the second blank 203 will be described according to an exemplary embodiment.

The first blank 103 can be inverted, e.g., such that the exterior surface 101 thereof is positioned on a supporting surface and such that an interior surface thereof is positioned facing upwardly. The plurality of lower side panels 113 can be folded into generally upright relation with the central panel 111 at the respective fold lines 115A, 115B, 115C, 115D, 115E, 115F, 115G, 115H to at least partially form the first portion 105 of the tray 110.

Simultaneously or thereafter, the second blank 203 can be positioned above the first blank 103/first portion 105 and the upper side panels 213 can be folded downwardly relative to the flange panel 211 at the respective fold lines 215A, 215B, 215C, 215C, 215D, 215E, 215F, 215G, 215H to at least partially form the second portion 205 of the tray 110.

In such an arrangement, the upper side panels 213 can be positioned in at least partial face-to-face contact with the respective lower side panels 113 to form respective sidewalls 219 of the tray 110 that extend at least partially around an interior 107 of the tray 110. In some embodiments, the respective side panels 113, 213 can be adhered to one another with an adhesive such as glue. As shown, adjacent sidewalls of the plurality of sidewalls 219 can be obliquely arranged relative to one another.

Such engagement of the first portion 105 of the tray 110 and the second portion 205 of the tray 110 can cause the respective distal portions 119 of the respective lower side panels 113 to fold relative to the respective base portions 117 of the respective lower side panels 113 at the respective fold lines 121A, 121B, 121C, 121D, 121E, 121F, 121G, 121H and into at least partial face-to-face contact with respective portions of the interior surface (e.g., supporting surface-facing surface) of the flange panel 211. In some embodiments, such positioning of the respective distal portions 119 can be effected prior to engagement of the first portion 105 and second portion 205 of the tray 110.

In this regard, the distal portions 119 of the respective lower side panels 113 can cooperate with the flange panel 211 to form a reinforced flange 221 of the tray 110 in which multiple plies of material are at least overlapped to form the flange 221, e.g., for strength, rigidity, etc. As shown, the flange panel 211 extend outwardly away, e.g., away from the interior 107 of the tray 110, from the panels 113, 213. The flange panel 211 can be arranged in generally spaced and parallel relation with the central panel 111.

It will be understood that the formed configuration of the tray 110 can be effected via one or more applications of an adhesive such as glue. For example, one or more applications of an adhesive can be provided between one or more respective lower side panel 113 and one or more respective upper side panel 213. As another example, one or more applications of an adhesive can be provided between one or more respective distal portion 119 of a lower side panel 113 and one or more respective portion of the flange panel 211 such that the distal portions 119 of the lower side panels 113 provide additional points of attachment to the flange panel 211/second portion 205 of the tray 110 to secure the first portion 105 and second portion 205 of the tray 110 together, as well as to maintain the relative position of the sidewalls 219 and flange 221 thereof.

It will be understood that one or more features of the tray 110 can be alternatively arranged, dimensioned, and/or configured without departing from the disclosure.

In some embodiments, a composite and/or polymeric sheet of material such as a liner can be applied to one or more portions of the interior 107 of the tray 110, for example, to prevent leakage, to maintain one or more sanitary conditions of one or more food products held therein, to increase the longevity of the tray 110 in the presence of fluids, etc. In such embodiments, the secure engagement of the first portion 105 and the second portion 205 of the tray 110, e.g., via the engagement of the distal portions 119 of the respective lower side panels 113 with respective portions of the flange panel 211, can minimize, inhibit, prevent, and/or otherwise avoid inadvertent separation of a liner from the tray 110. In some embodiments, such liner L can at least partially maintain an engaged relationship between the first tray portion 105 and the second tray portion 205 of the tray 110.

In this regard, the blanks 103, 203 and/or tray 110 formed therefrom can be provided with a liner L that comprises a plastic layer such as polyethylene, a polyethylene terephthalate (PET) material, or any other thermoplastic material, or a bioplastic, such as vegetable oil or starch based plastics. In one embodiment, such liner can comprise polyethylene that can be softened and fused to the blanks 103, 203/tray 110. In an alternative embodiment, a liner for being attached to the blanks 103, 203/tray 110 can comprise PET or a similar material that is at least partially attached to the blanks 103, 203/tray 110 by a heat seal layer (e.g., a thermoformable sealant grade transparent polyester packaging film, such as Mylar® XMPOL12 available from DuPont Teijin Films U.S. Limited Partnership of Hopewell, Virginia, or any suitable thermoformable sealant or adhesive, any suitable heat or pressure activated adhesive, or any other suitable material), wherein a PET liner can be more suitable for uses that require heating of the container in an oven.

Such a liner can be at least partially attached to the blanks 103, 203/tray 110 for being positioned in contact with one or more food products held in the tray 110 (e.g., during heating). In one embodiment, after heating the food product, the blanks 103, 203/tray 110 and an accompanying liner L can be separated to allow both the blank 103 and the liner to be recycled separately. Optionally, the blanks 103, 203 and tray 110 formed therefrom can be provided separately from the liner.

Figure 3:
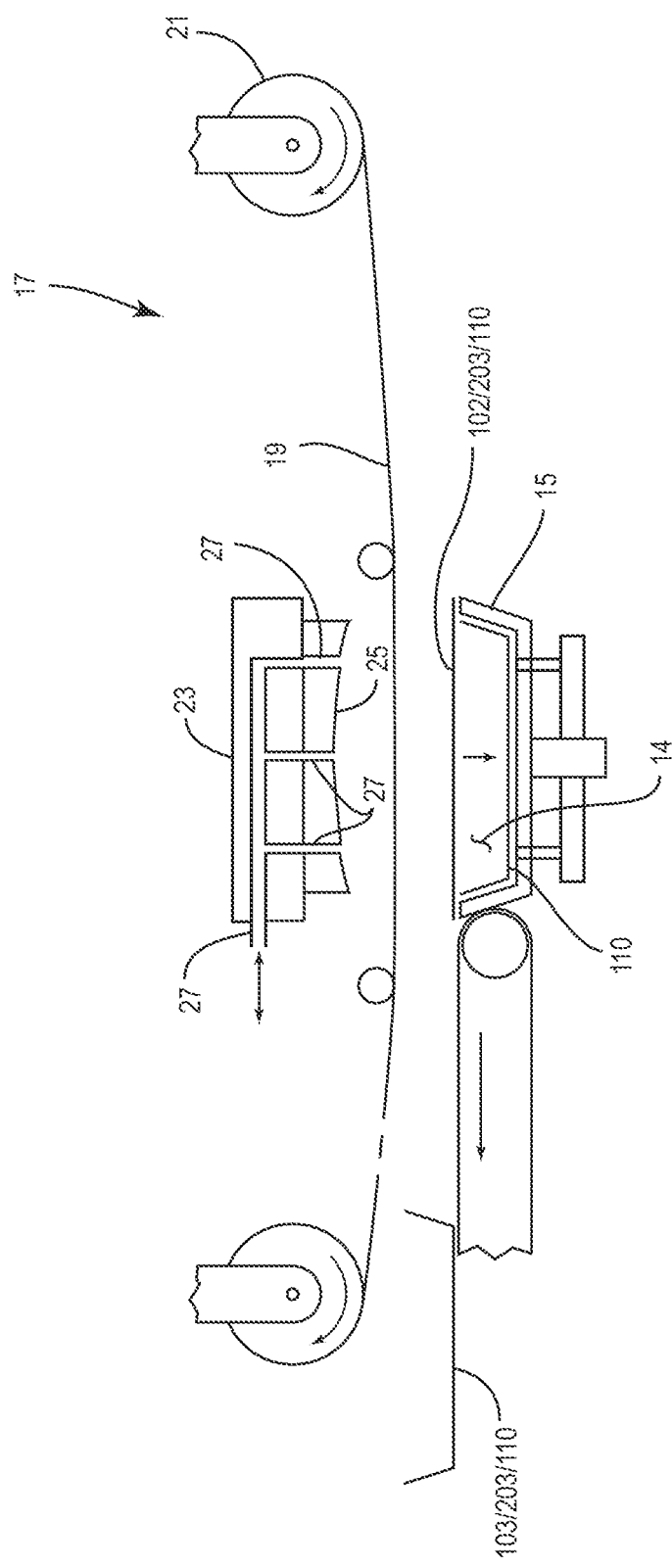
FIG. 3 is a schematic view of an apparatus for processing a blank and/or tray that can be used with exemplary embodiments of the present disclosure.

In an exemplary embodiment shown schematically in FIG. 3, the blanks 103, 203/tray 110 or a folded configuration thereof can be placed on a lower die 15 of a system 17 and a liner material or film sheet 19 (e.g., a polyethylene or PET web) can be fed from a supply roller 21 above the blanks 103, 203/tray 110. An upper die 23 has a heater plate surface 25 having a PTFE coating, for example a Teflon® coating available from the Chemours Company of Wilmington, DE. Alternatively, the heater plate surface 25 could have a coating of any suitable material or the coating could be omitted. As schematically shown in FIG. 3, the upper die 23 can include a plurality of holes or ducts 27 in the heater plate surface 25 for applying a vacuum and/or air pressure on the sheet 19. The lower die 15 and/or the upper die 23, including the ducts 27 and/or the heater plate 55, could be otherwise shaped, arranged, positioned, and/or configured without departing from the disclosure. For example, the heater plate 25 could be omitted and the heat could be alternatively applied to the sheet 19 (e.g., with a flow of hot air).

In the illustrated embodiment, the lower die 15 can hold the blanks 103, 203/tray 110 over a cavity 14 in the lower die 15 while supporting the blanks 103, 203/tray 110. An initial vacuum can be applied to ducts 27 to draw the film sheet 19 toward the upper die 23, the upper die 23 can be heated to a suitable temperature to soften the film sheet 19 and/or to activate a heat seal layer. Instead of, or in addition to, the initial vacuum, air pressure under the film sheet 19 can be employed with similar or equal effect. Subsequently, the film sheet 19 can be forced downwardly (e.g., by air pressure applied by the ducts 27 and/or a vacuum applied from below the blank 103/tray 105).

The air pressure can move the film sheet 19 toward the blanks 103, 203/tray 110 and the lower die 15 can support the blanks 103, 203/tray 110 as the film sheet 19 is applied to portions of one or more portions thereof to form the liner L. In one embodiment, the liner L can help retain the tray 110 in its tray shape after the liner L is applied to the blanks 103, 203. In one embodiment, the tray 110 can be ejected from the lower die 15 and transported away from the forming tool on a conveyor, for example.

In one embodiment, the tray 110 can be formed from the blanks 103, 203 and have the liner L applied thereto at a much higher rate than systems that separately form the tray 110 from the blanks 103, 203 and then place that formed tray 110 into the lower die 15. In one example, the tray 110 of the present embodiment can be formed from the blanks 103, 203 together with the liner L at a rate of approximately 500 trays per minute. The tray 110 could be otherwise formed without departing from the disclosure. For example, the tray 110 could be formed from the blanks 103, 203 prior to applying the liner L (e.g., prior to engaging the lower die 15).

Figure 6:
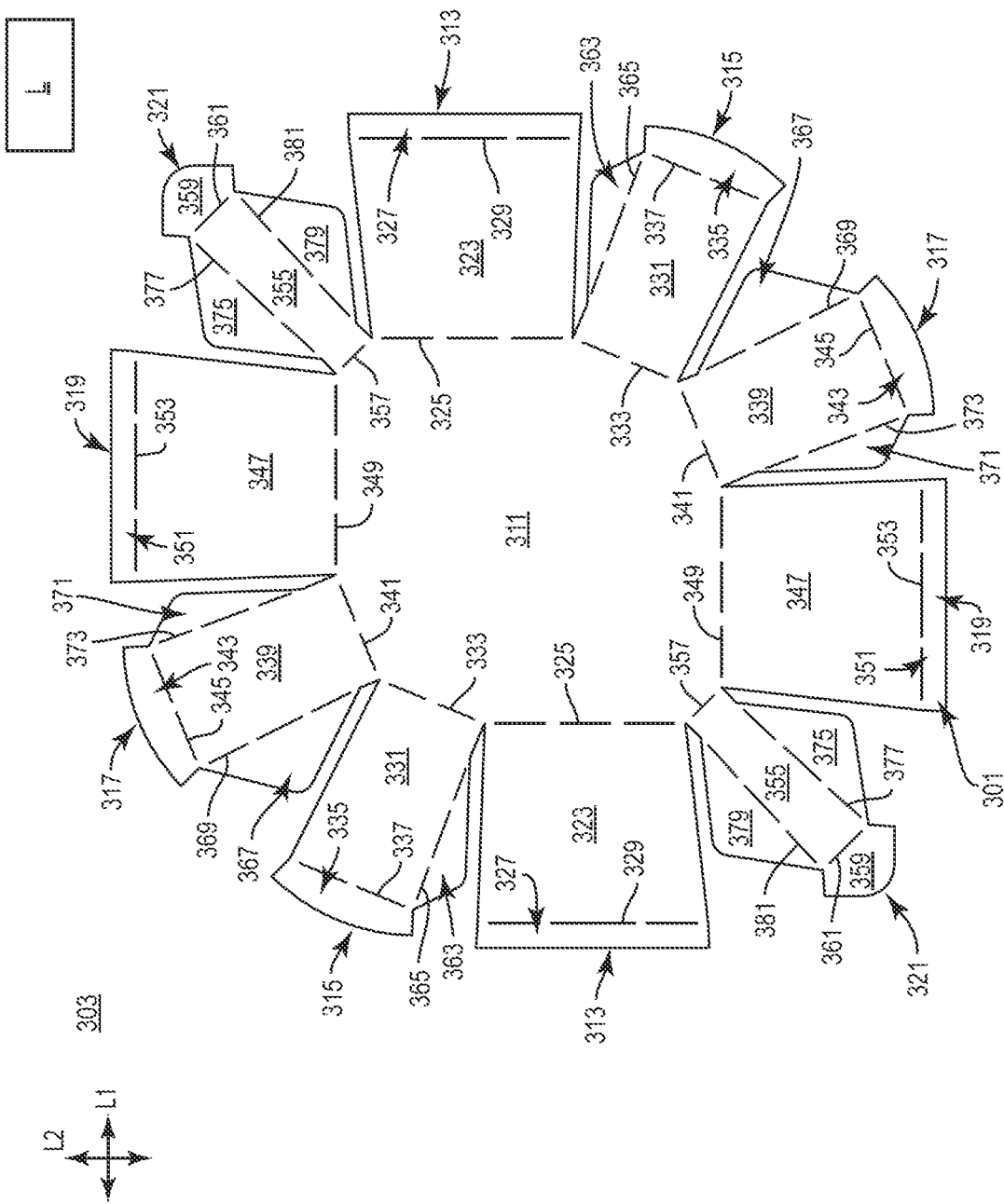
FIG. 6 is a plan view of a first blank for at least partially forming a tray for holding food products according to a second exemplary embodiment of the disclosure.

Turning to FIG. 6, the exterior surface 301 of a base blank or first blank 303 for forming a base portion or first tray portion 305 of a tray 310 is illustrated according to a second exemplary embodiment of the disclosure.

As shown, the blank 303 has the longitudinal direction L1 and the lateral direction L2. In the illustrated embodiment, the blank 303 includes a plurality of panels for extending at least partially around an interior 307 of the tray 310, and which can include a base panel or bottom panel or central panel 311.

The central panel 311, as shown, can have an irregular but obliquely symmetrical 10-sided arrangement, though can be provided with sides of non-uniform length so as to have an overall generally rectilinear cross-sectional profile. It will be understood that the central panel 311 can have a different arrangement without departing from the disclosure.

The plurality of panels of the blank 303 and first tray portion 305/tray 310 formed therefrom can include a plurality of lower panels that include respective pairs of side panels 313, 315, 317, 319, 321 positioned in opposed relation along the central panel 311.

The side panels 313, as shown, can each include a respective base portion 323 foldably connected to the central panel 311 at a respective lateral fold line 325, and a respective distal portion 327 foldably connected to the respective base portion 323 at a respective lateral fold line 329.

The side panels 315 can include a respective base portion 331 foldably connected to the central panel 311 at a respective oblique fold line 333, and a respective distal portion 335 foldably connected to the respective base portion 331 at a respective lateral fold line 337.

Similarly, the side panels 317 can include a respective base portion 339 foldably connected to the central panel 311 at a respective oblique fold line 341, and a respective distal portion 343 foldably connected to the respective base portion 339 at a respective oblique fold line 345.

The side panels 319, as shown, can each include a respective base portion 347 foldably connected to the central panel 311 at a respective longitudinal fold line 349, and a respective distal portion 351 foldably connected to the respective base portion 347 at a respective longitudinal fold line 353.

The side panels 321 can include a respective base portion 355 foldably connected to the central panel 311 at a respective oblique fold line 357, and a respective distal portion 359 foldably connected to the respective base portion 355 at a respective oblique fold line 361.

The blank 303 and tray portion 305/tray 310 formed therefrom can also include a plurality of end flaps foldably connected to a respective panel/side panel of the plurality of panels/side panels.

In the illustrated embodiment, the plurality of end flaps can include a corner end flap 363 foldably connected to the respective base portions 331 of the respective side panels 315 at respective oblique fold lines 365.

A corner end flap 367 can be foldably connected to the respective base portion 339 of the respective side panels 317 at a respective oblique fold line 369, and another corner end flap 371 can be foldably connected to an opposite edge of the respective base portion 339 of the respective side panels 317 at a respective oblique fold line 373.

Similarly, a corner end flap 375 can be foldably connected to the respective base portion 355 of the respective side panels 321 at a respective oblique fold line 377, and another corner end flap 379 can be foldably connected to an opposite edge of the respective base portion 355 of the respective side panels 321 at a respective oblique fold line 381.

Figure 7:
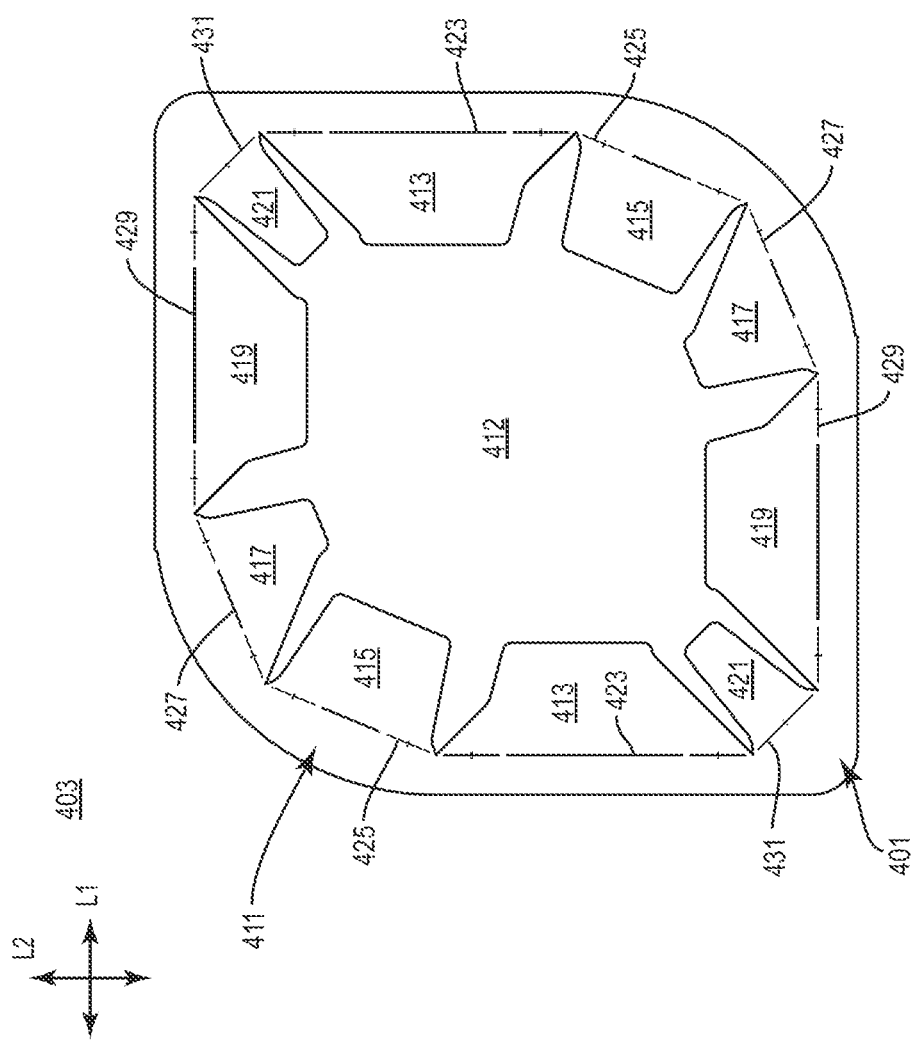
FIG. 7 is a plan view of a second blank for at least partially forming a tray for holding food products according to the second exemplary embodiment of the disclosure.

Turning to FIG. 7, an exterior surface 401 of a crown blank or second blank 403 for forming a crown portion or second portion 405 of the tray 310 is illustrated.

As shown, the blank 403 can have the longitudinal axis L1, the lateral axis L2, and a top panel or flange panel 411 generally forming a perimeter of the blank 403 so as to extend at least partially around a central opening 412 into which a plurality of panels of the blank 403 and second portion 405/tray 310 extend.

In the illustrated embodiment, the flange panel 411 can have a configuration generally complementary to that of the central panel 311 discussed above, though it will be understood that the flange panel 411 can have a different configuration without departing from the disclosure. As shown, the flange panel 411 can have an outer perimeter length greater than that of the central panel 311.

The blank 403 and tray portion 405/tray 310 formed therefrom can include a plurality of side panels extending into the central opening 412 that include respective pairs of side panels 413, 415, 417, 419, 421 positioned in opposed relation along the flange panel 411.

The side panels 413 can be foldably connected to the flange panel 411 at a respective lateral fold line 423, the side panels 415 can be foldably connected to the flange panel 411 at respective oblique fold line 425, the side panels 417 can be foldably connected to the flange panel 411 at respective oblique fold lines 427, the side panels 419 can be foldably connected to the flange panel 411 at respective longitudinal fold lines 429, and the side panels 421 can be foldably connected to the flange panel 411 at respective oblique fold lines 431.

While the side panels 413, 415, 417, 419, 421 have a configuration generally complementary to that of the respective side panels 313, 315, 317, 319, 321, it will be understood that one or more of the side panels 413, 415, 417, 419, 421 can have a different configuration without departing from the disclosure.

With additional reference to FIG. 8, formation of the tray 310 from the cooperation of the first blank 303 and the second blank 403 will be described according to an exemplary embodiment.

The first blank 303 can be inverted, e.g., such that the exterior surface 301 thereof is positioned on a supporting surface and such that an interior surface is facing upwardly. The plurality of lower side panels 313, 315, 317, 319, 321 can be folded into generally upright relation with the central panel 311 at the respective fold lines 325, 333, 341, 349, 357.

The second blank 403 can then be positioned above the first blank 303/first portion 305 and the upper side panels 413, 415, 417, 419, 421 can be folded downwardly relative to the flange panel 411 at the respective fold lines 423, 425, 427, 429, 431 to at least partially form the second portion 405 of the tray 310.

In such an arrangement, the lower side panels 313, 315, 317, 319, 321 can be positioned in at least partial face-to-face contact with the respective upper side panels 419, 417, 415, 413, 421 to form respective sidewalls 433/435, 437/439, 441/443, 445/447, 449/451 of the tray 310 that extend at least partially around the interior 307 of the tray 310. In some embodiments, the respective side panels 313, 315, 317, 319, 321, 419, 417, 415, 413, 421 can be adhered to one another with an adhesive such as glue. As shown, adjacent sidewalls of the plurality of sidewalls 433, 435, 437, 439, 441, 443, 445, 447, 449, 451 can be obliquely arranged relative to one another.

Such engagement of the first portion 305 of the tray 310 and the second portion 405 of the tray 110 can cause the distal portions 327 of the respective side panels 313 to fold outwardly, e.g., in generally spaced and parallel relation above and extending away from the central panel 311, at the respective fold lines 329, can cause the distal portions 335 of the respective side panels 317 to fold outwardly at the respective fold lines 337, can cause the distal portions 343 of the respective side panels 317 to fold outwardly at the respective fold lines 345, can cause the distal portions 351 of the respective side panels 319 to fold outwardly at the respective fold lines 353, and can cause the distal portions 359 of the respective side panels 321 to fold outwardly at the respective fold lines 361 to at least partially form the first portion 305 of the tray 310.

In this regard, the distal portions 327, 335, 343, 351, 359 of the respective lower side panels 313, 315, 317, 319, 321 can cooperate with the flange panel 411 of the upper portion 405 to form a reinforced flange 463 of the tray 310 in which multiple plies of material are at least overlapped to form the flange 463, e.g., for strength, rigidity, etc. As shown, the flange panel 411 extends outwardly away, e.g., away from the interior 307 of the tray 310, from the panels 313, 315, 317, 319, 321, 419, 417, 415, 413, 421. The flange panel 411 can be arranged in generally spaced and parallel relation with the central panel 311.

Furthermore, the interior surface of the respective corner end flaps 363 can be positioned in at least partial face-to-face contact with a portion of the respective base portion 323 of the respective adjacent side panel 313. It will be understood that such positioning of one or both of the corner end flaps 363 can include at least partial folding thereof relative to a respective base portion 331 of a respective side panel 315 at a respective fold line 365.

Figure 8:
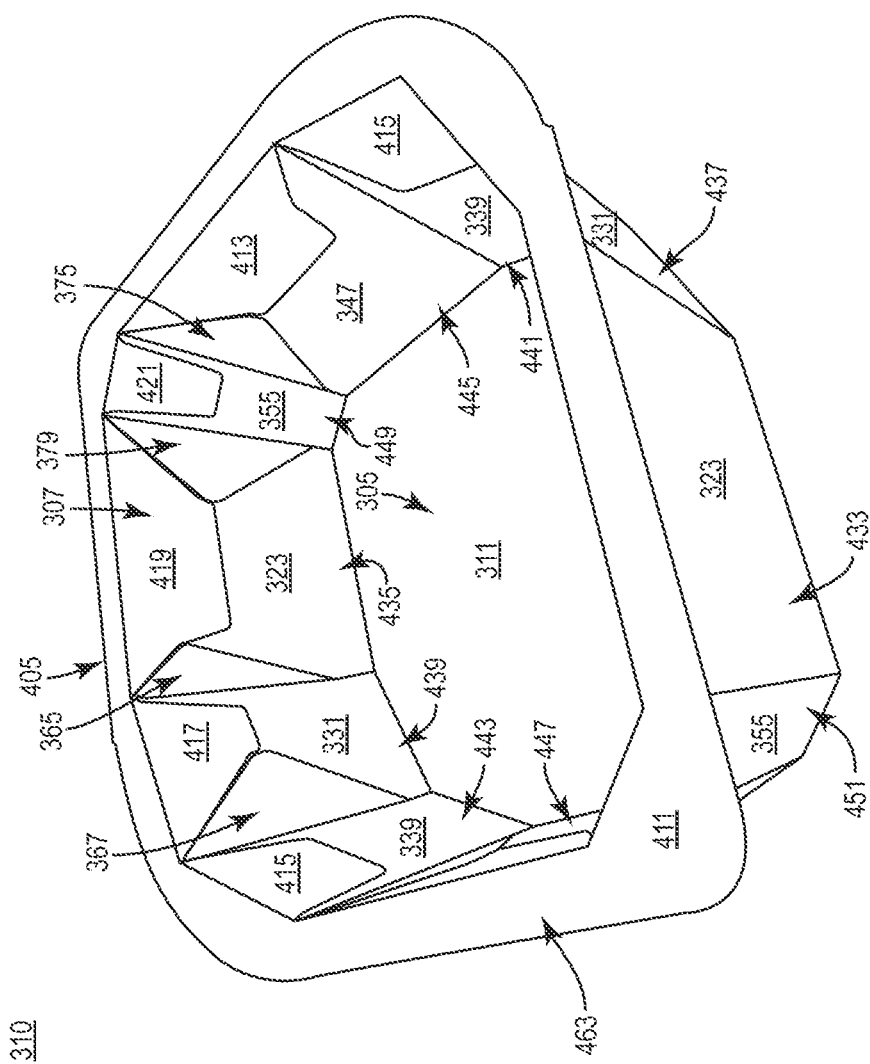
FIG. 8 is a perspective view of a tray formed from the blanks of FIG. 6 and FIG. 7 according to the second exemplary embodiment of the disclosure.

With continued reference to FIGS. 6-8, the interior surface of the respective corner end flaps 367 can be positioned in at least partial face-to-face contact with a portion of the respective base portion 331 of the respective adjacent side panel 315. Similarly, the interior surface of the respective corner end flaps 371 can be positioned in at least partial face-to-face contact with a portion of the respective base portion 347 of the respective adjacent side panel 319. It will be understood that such positioning of one or more of the respective corner end flaps 367, 371 can include at least partial folding thereof at a respective base portion 339 of a respective side panel 317 at a respective fold line 369, 373.

Similarly, the interior surface of the respective corner end flaps 375 can be positioned in at least partial face-to-face contact with a portion of the respective base portion 347 of the respective adjacent side panel 319. The interior surface of the respective corner end flaps 379 can be positioned in at least partial face-to-face contact with a portion of the respective base portion 323 of the respective adjacent side panel 313. It will be understood that such positioning of one or more of the respective corner end flaps 375, 379 can include at least partial folding thereof at a respective base portion 355 of a respective side panel 321 at a respective fold line 377, 381.

The aforementioned positioning of the corner end flaps 363, 367, 371, 375, 379 can at least partially overlie gaps, e.g., seams, between generally abutting or otherwise proximate respective adjacent side panels 313, 315, 317, 319, 321, can provide at least partial resistance to leakage of fluid contents (e.g., dressings, condensation, runoff, etc.) associated with food products in the interior 307 of the tray 310.

Furthermore, the positioning of the corner end flaps 363, 367, 371, 375, 379 overlapping the respective side panels 313, 315, 317, 319, 321 can provide reinforcement to the respective sidewalls 433, 435, 437, 439, 441, 443, 445, 477, 449, 451, e.g., such that a two-ply configuration is provided at such overlapping portions to avoid, for example, buckling, bowing, other unwanted deformation, etc.

In some embodiments, a composite and/or polymeric sheet of material such as liner L can be applied to one or more portions of the interior 307 of the tray 310, for example, to prevent leakage, to maintain one or more sanitary conditions of one or more food products held therein, to increase the longevity of the tray 310 in the presence of fluids, etc. In some embodiments, the secure engagement of the first portion 305 and the second portion 405 of the tray 310, can minimize, inhibit, prevent, and/or otherwise avoid inadvertent separation of a liner from the tray 310. In some embodiments, such liner L can at least partially maintain an engaged relationship between the first tray portion 305 and the second tray portion 405 of the tray 310. It will be understood that a liner can be applied to the blanks 303, 403 and/or the tray 310 formed therefrom in the manner described above with respect to the blanks 103, 203 and/or the tray 110 formed therefrom and as illustrated schematically in FIG. 3.

In some embodiments, it will be understood that the formed configuration of the tray 310 can be effected via one or more applications of an adhesive such as glue.

It will be understood that one or more features of the tray 310 can be alternatively arranged, dimensioned, and/or configured without departing from the disclosure.

For example, according to an alternative exemplary embodiment of the disclosure blanks and trays formed therefrom can be devoid of the side panels 331, 417 and associated features, with the central panel 311 being configured accordingly, such that the tray has the general shape of a four sided tray with four oblique corners.

Figure 9:
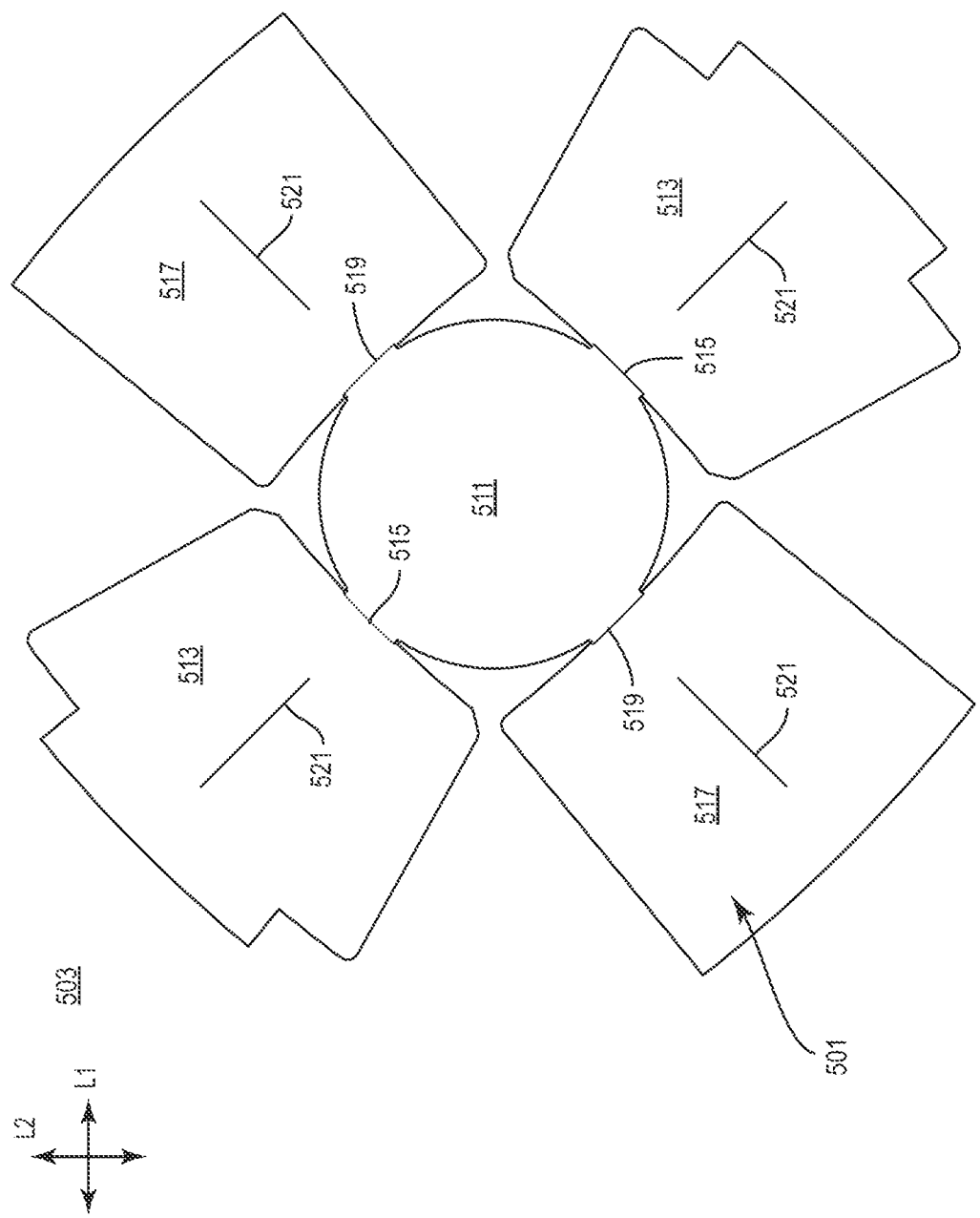
FIG. 9 is a plan view of a first blank for at least partially forming a tray for holding food products according to a third exemplary embodiment of the disclosure.

Turning to FIG. 9, the exterior surface 501 of a base blank or first blank 503 for forming a base portion or first tray portion 505 of a tray 510 is illustrated according to a third exemplary embodiment of the disclosure.

As shown, the blank 503 has a longitudinal direction L1 and a lateral direction L2. In the illustrated embodiment, the blank 503 includes a plurality of panels for extending at least partially around an interior 507 of the tray 510, and which can include a base panel or bottom panel or central panel 511.

The central panel 511, as shown, can have a generally circular arrangement, though the central panel 511 can have a different arrangement without departing from the disclosure.

The plurality of panels of the blank 503 and first tray portion 505/tray 510 formed therefrom can include a plurality of upper side panels that includes respective pairs of side panels 513, 517 positioned in opposed relation along the central panel 511. The side panels 513 can be foldably connected to the central panel 511 at respective oblique fold lines 515, and the side panels 517 can be foldably connected to the central panel 511 at respective oblique fold lines 519.

Each side panel 513, 517, as shown, can include a respective oblique line of weakening 521 extending at least partially therealong to facilitate formation of the first tray portion 505 of the tray 510, as described further herein.

Figure 10:
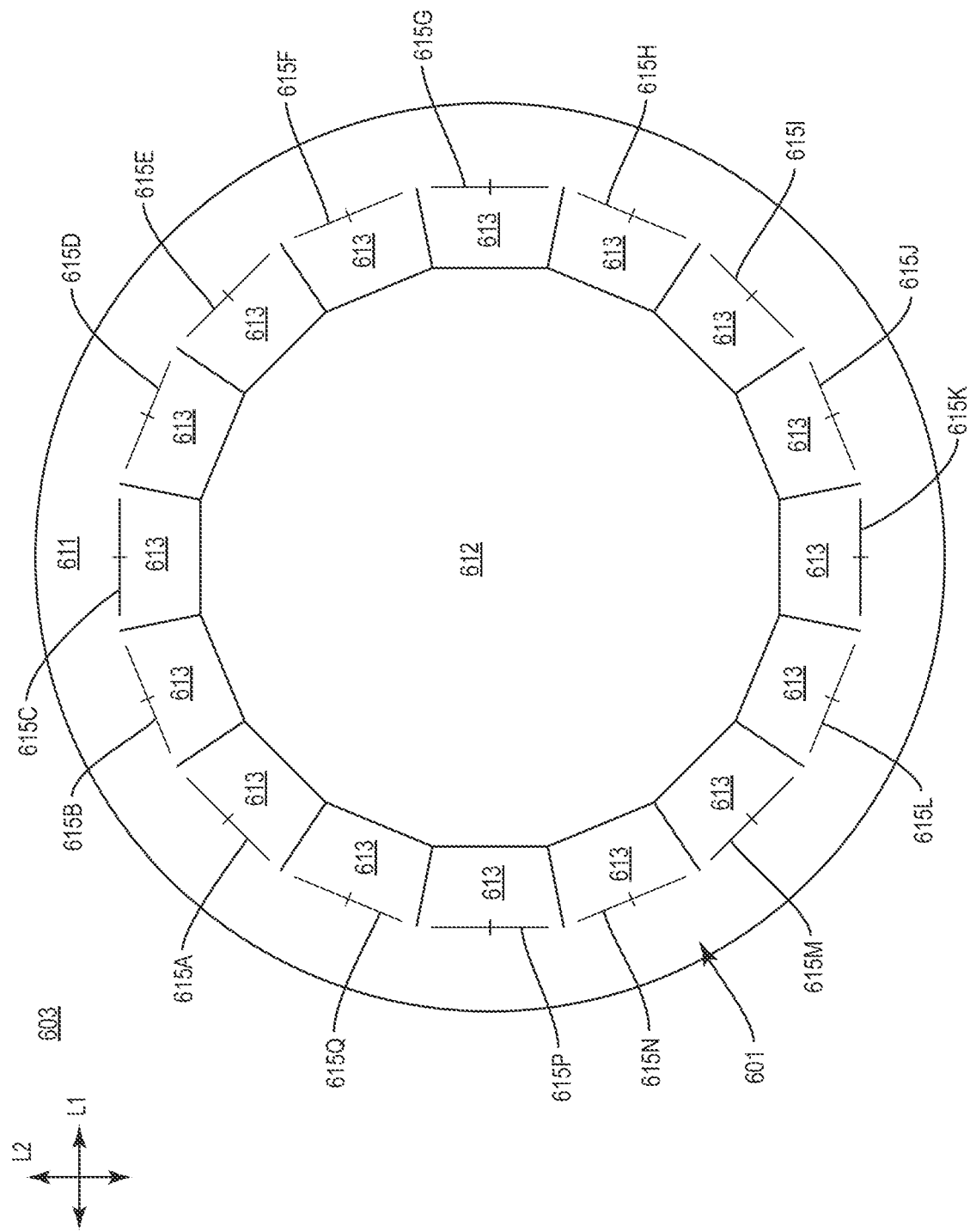
FIG. 10 is a plan view of a second blank for at least partially forming a tray for holding food products according to the third exemplary embodiment of the disclosure.

Turning to FIG. 10, an exterior surface 601 of a crown blank or second blank 603 for forming a crown portion or second portion 605 of the tray 510 is illustrated.

As shown, the blank 603 can have the longitudinal axis L1, the lateral axis L2, and a top panel or flange panel 611 generally forming a perimeter of the blank 603 so as to extend at least partially around a central opening 612 into which a plurality of panels of the blank 603 and second portion 605/tray 510 extend.

In the illustrated embodiment, the flange panel 611 can have a configuration generally complementary to that of the central panel 511 discussed above, though it will be understood that the flange panel 611 can have a different configuration without departing from the disclosure. As shown, the flange panel 611 can have an outer perimeter length greater than that of the central panel 511.

The blank 603 and tray portion 605/tray 510 formed therefrom can include a plurality of side panels extending into the central opening 612 that include a plurality of circumferentially arranged side panels 613 positioned extending into the central opening 612.

Each side panel 613, as shown, can be foldably connected to the flange panel 611 at a respective line of weakening 615A, 615B, 615C, 615G, 615E, 615F, 615G, 615H, 615I, 615I, 615K, 615L, 615M, 615N, 615P, 615Q. In addition, each side panel 613 can be at least partially separable from a respective adjacent side panel 613 at a respective oblique cut.

Figure 11:
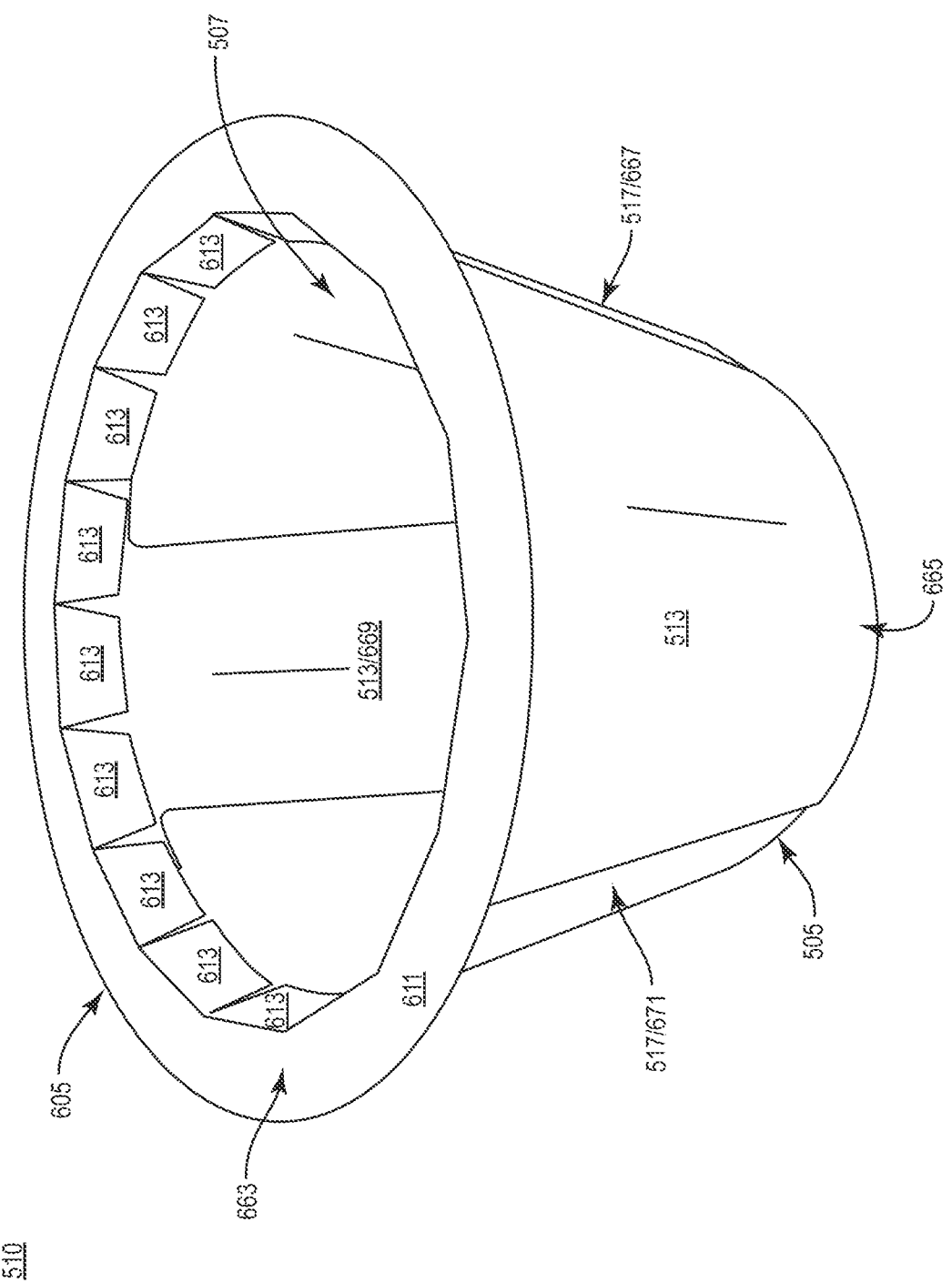
FIG. 11 is a perspective view of a tray formed from the blanks of FIG. 9 and FIG. 10 according to the third exemplary embodiment of the disclosure.
Figure 12:
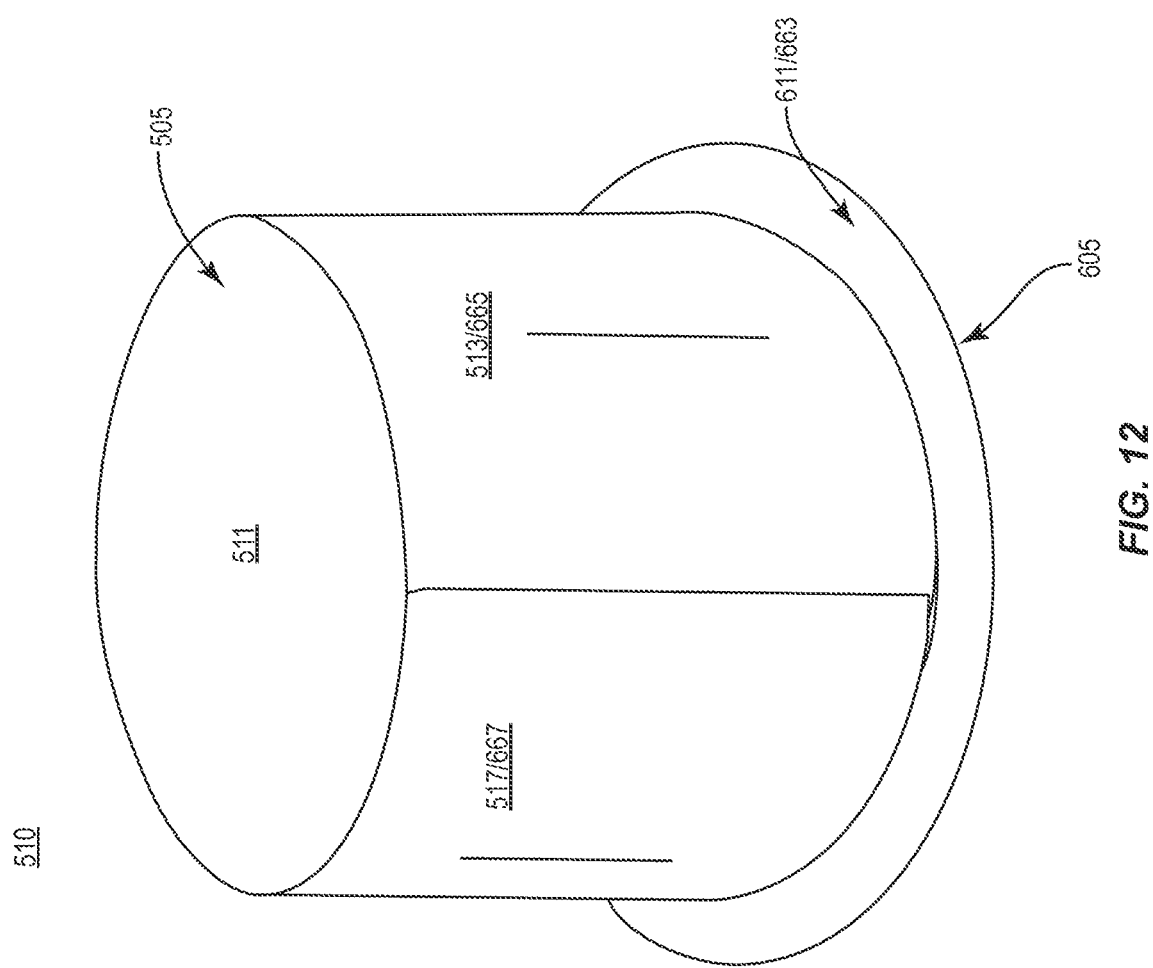
FIG. 12 is another perspective view of the tray of FIG. 11.

With additional reference to FIGS. 11 and 12, formation of the tray 510 from the cooperation of the first blank 503 and the second blank 603 will be described according to an exemplary embodiment.

The first blank 503 can be inverted, e.g., such that the exterior surface 501 thereof is positioned on a supporting surface and such that an interior surface is facing upwardly. The plurality of lower side panels 513, 517 can be folded into generally upright relation with the central panel 511 at the respective fold lines 515, 519.

In such an arrangement, the side panels 513, 517 can be at least partially flexed, curved, etc., at the respective lines of weakening 521, with the side panels 517 overlapping, e.g., in at least partial face-to-face contact with respective lateral marginal portions of the adjacent side panels 513.

The upper side panels 613 of the second blank 603 can then be folded downwardly relative to the flange panel 615 at the respective fold lines 615A-615Q to at least partially form the second portion 605 of the tray 510. In this regard, the upper side panels 613 can be positioned in at least partial face-to-face contact with respective upper marginal portions of the respective lower side panels 513, 517.

In such an arrangement, the upper side panels 613 can be positioned in at least partial face-to-face contact with the respective lower side panels 513, 517 to form respective sidewalls 665, 667, 669, 671 of the tray 510 that extend at least partially around an interior 507 of the tray 510. In some embodiments, respective side panels 513, 517, 613 can be adhered to one another with an adhesive such as glue. As shown, adjacent sidewalls of the plurality of sidewalls 665, 667, 669, 671 can be arranged generally extending along a common line of curvature relative to one another.

In this regard, the upper side panels 613 can extend downwardly from the flange panel 611 of the upper portion 605, with the flange panel 611 forming a flange or reinforced flange 663 of the tray 510. As shown, the flange panel 611 extends outwardly away, e.g., away from the interior 607 of the tray 610, from the panels 513, 517, 613. The flange panel 611 can be arranged in generally spaced and parallel relation with the central panel 511.

The aforementioned positioning of the lower side panels 513, 517 can at least partially overlie gaps, e.g., seams, between generally abutting or otherwise proximate respective adjacent side panels 513, 517, can provide at least partial resistance to leakage of fluid contents (e.g., dressings, condensation, runoff, etc.) associated with food products in the interior 507 of the tray 510.

Furthermore, the positioning of the side panels 513, 517 can provide reinforcement to the respective sidewalls 665, 667, 669, 671, e.g., such that a two-ply configuration is provided at such overlapping portions to avoid, for example, buckling, bowing, other unwanted deformation, etc.

In some embodiments, a composite and/or polymeric sheet of material such as liner L can be applied to one or more portions of the interior 507 of the tray 510, for example, to prevent leakage, to maintain one or more sanitary conditions of one or more food products held therein, to increase the longevity of the tray 510 in the presence of fluids, etc. In some embodiments, the secure engagement of the first portion 505 and the second portion 605 of the tray 510, can minimize, inhibit, prevent, and/or otherwise avoid inadvertent separation of a liner from the tray 510. In some embodiments, such liner L can at least partially maintain an engaged relationship between the first tray portion 505 and the second tray portion 605 of the tray 510. It will be understood that a liner can be applied to the blanks 503, 603 and/or the tray 510 formed therefrom in the manner described above with respect to the blanks 103, 203, 303, 403 and/or the trays 110, 310 formed therefrom and as illustrated schematically in FIG. 3.

In some embodiments, it will be understood that the formed configuration of the tray 510 can be effected via one or more applications of an adhesive such as glue.

It will be understood that one or more features of the tray 510 can be alternatively arranged, dimensioned, and/or configured without departing from the disclosure.

Figure 13:
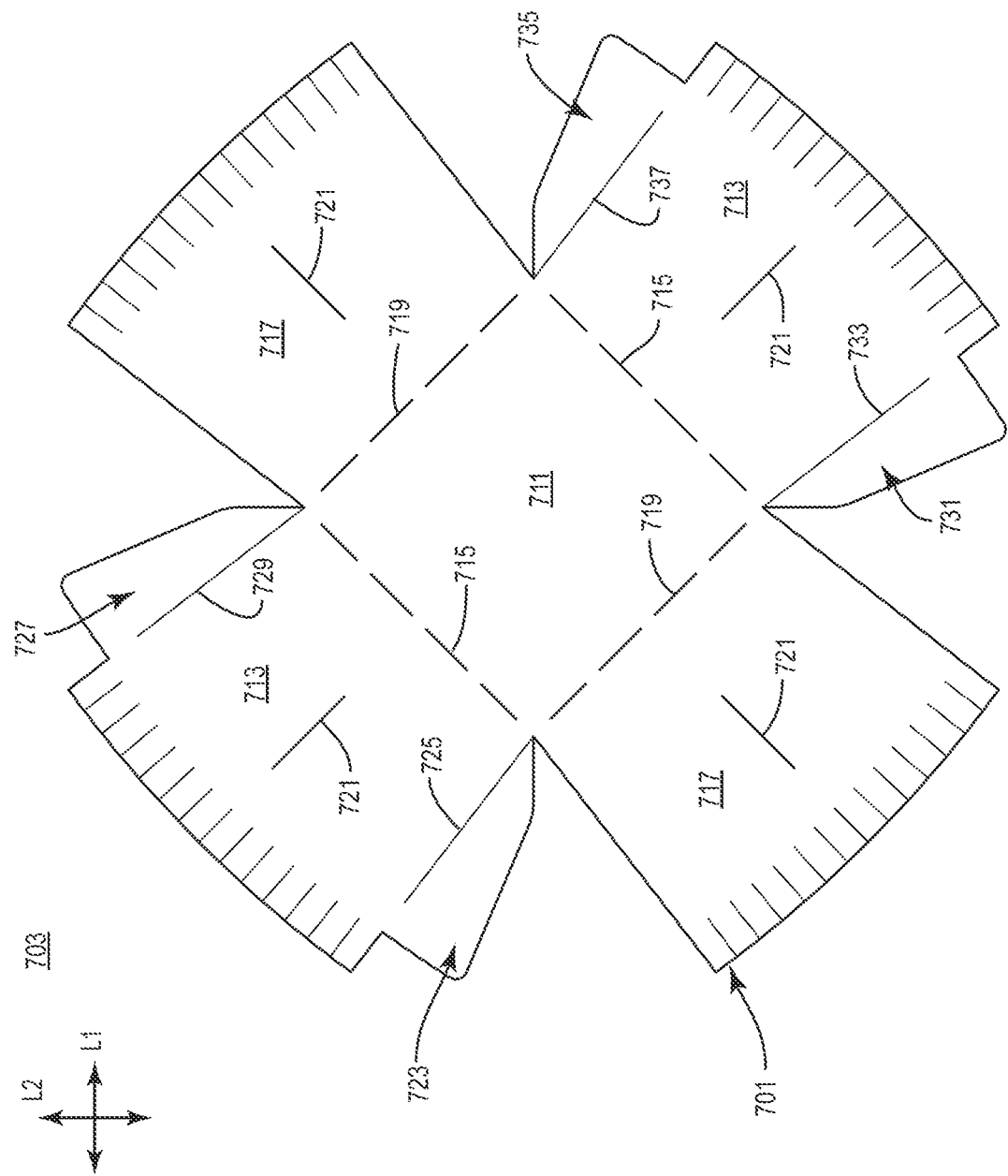
FIG. 13 is a plan view of a first blank for at least partially forming a tray for holding food products according to a fourth exemplary embodiment of the disclosure.

Turning to FIG. 13, the exterior surface 701 of a base blank or first blank 703 for forming a base portion or first tray portion 705 of a tray 710 is illustrated according to a fourth exemplary embodiment of the disclosure.

As shown, the blank 703 has a longitudinal direction L1 and a lateral direction L2. In the illustrated embodiment, the blank 703 includes a plurality of panels for extending at least partially around an interior 707 of the tray 710, and which can include a base panel or bottom panel or central panel 711.

The central panel 711, as shown, can have a four-sided, generally square or rectangular arrangement, though it will be understood that the central panel 711 can have a different arrangement without departing from the disclosure.

The plurality of panels of the blank 703 and first tray portion 705/tray 710 formed therefrom can include a plurality of lower side panels that include respective pairs of side panels 713, 717 positioned in opposed relation along the central panel 711, with the side panels 713 foldably connected to the central panel 711 at respective oblique fold lines 715, and with the side panels 717 foldably connected to the central panel 711 at respective oblique fold lines 719.

Each side panel 713, 717, as shown, can include a respective oblique line of weakening 721 extending at least partially therealong to facilitate formation of the first tray portion 705 of the tray 710, as described further herein. In some embodiments, one or more of the side panels 713, 717 can include a plurality of additional lines of weakening along an upper marginal portion thereof.

The blank 703 and tray portion 705/tray 710 formed therefrom can also include a plurality of end flaps foldably connected to a respective panel/side panel of the plurality of panels/side panels.

In the illustrated embodiment, the plurality of end flaps can include corner end flaps 723, 727 at least partially foldably connected to a respective side panel 713 at respective oblique fold lines 735, 729, and corner end flaps 731, 735 at least partially foldably connected to a respective side panel 713 at respective oblique fold lines 733, 737.

Figure 14:
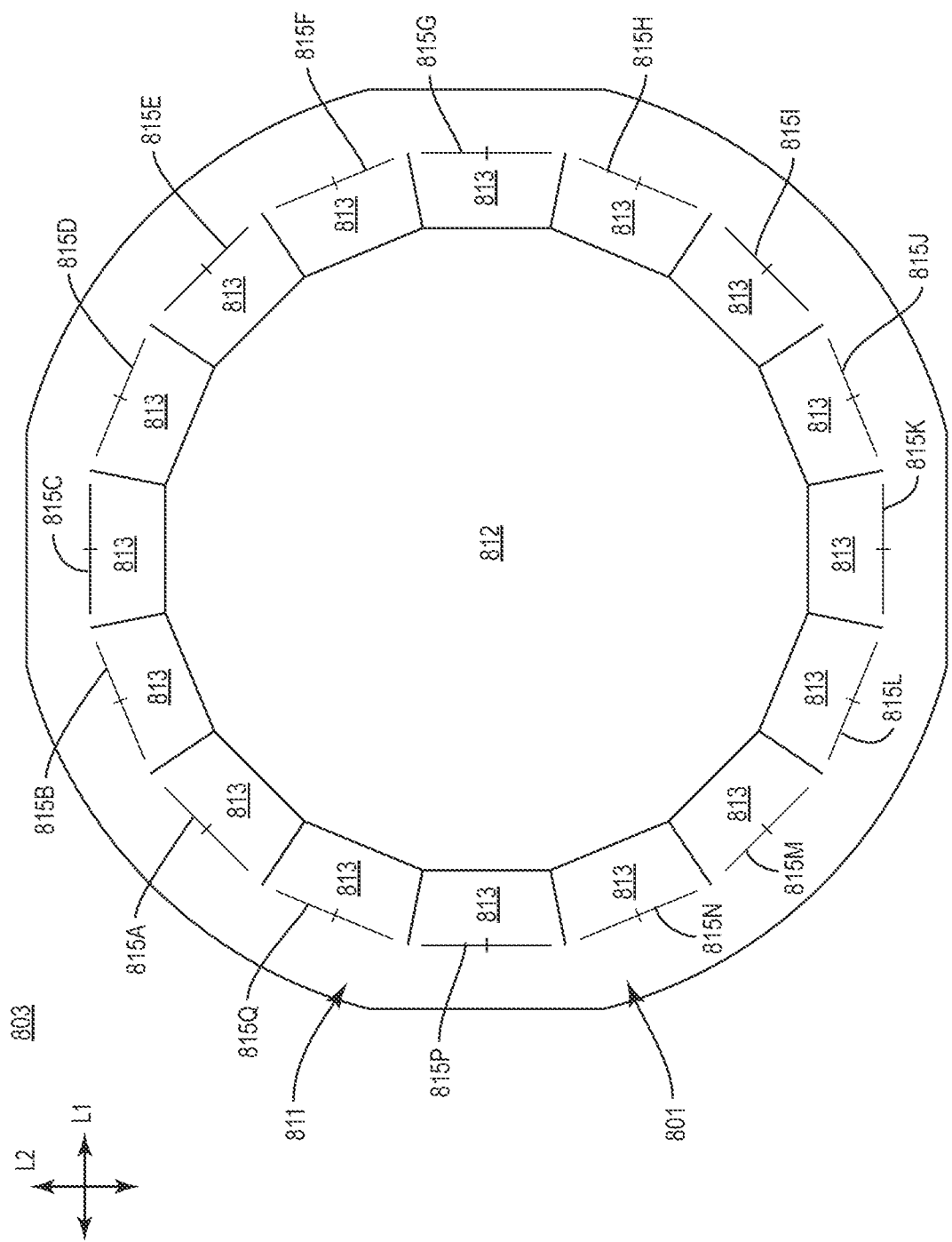
FIG. 14 is a plan view of a second blank for at least partially forming a tray for holding food products according to the fourth exemplary embodiment of the disclosure.

Turning to FIG. 14, an exterior surface 801 of a crown blank or second blank 803 for forming a crown portion or second portion 805 of the tray 710 is illustrated.

As shown, the blank 803 can have the longitudinal axis L1, the lateral axis L2, and a top panel or flange panel 811 generally forming a perimeter of the blank 803 so as to extend at least partially around a central opening 812 into which a plurality of panels of the blank 803 and second portion 805/tray 710 extend.

In the illustrated embodiment, the flange panel 811 can have a generally circular arrangement with one or more pairs of diametrically opposed flattened edges, though the flange panel 811 can have a different configuration without departing from the disclosure. As shown, the flange panel 811 can have an outer perimeter length greater than that of the central panel 711.

The blank 803 and tray portion 805/tray 710 formed therefrom can include a plurality of side panels extending into the central opening 812 that includes a plurality of circumferentially arranged side panels 813 positioned extending into the central opening 812.

Each side panel 813, as shown, can be foldably connected to the flange panel 811 at a respective line of weakening 815A, 815B, 815C, 815G, 815E, 815F, 815G, 815H, 815I, 815I, 815K, 815L, 815M, 815N, 815P, 815Q. In addition, each side panel 813 can be at least partially separable from a respective adjacent side panel 813 at a respective oblique cut.

Figure 15:
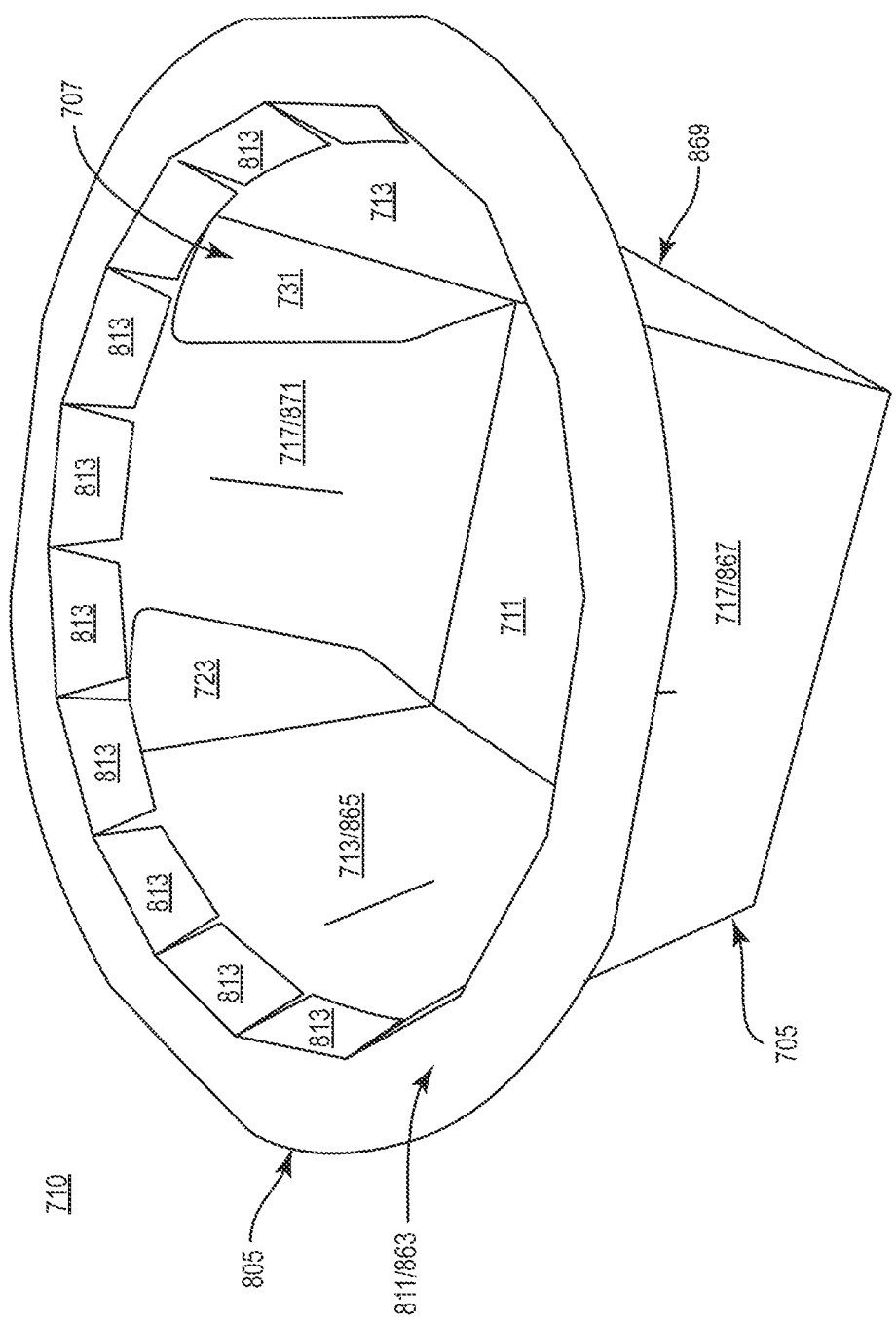
FIG. 15 is a perspective view of a tray formed from the blanks of FIG. 13 and FIG. 14 according to the fourth exemplary embodiment of the disclosure.

With additional reference to FIGS. 15-16, formation of the tray 710 from the cooperation of the first blank 703 and the second blank 803 will be described according to an exemplary embodiment.

The first blank 703 can be inverted, e.g., such that the exterior surface 701 thereof is positioned on a supporting surface and such that an interior surface is facing upwardly. The plurality of lower side panels 713, 717 can be folded into generally upright relation with the central panel 711 at the respective fold lines 715, 719.

In such an arrangement, the side panels 713, 717 can be at least partially flexed, curved, etc., at the respective lines of weakening 721, with an interior surface of the side panels 717 overlapping, e.g., in at least partial face-to-face contact with, the exterior surface of respective corner end flaps 723, 727, 731, 735 extending from the respective side panels 713. Such movement of the corner end flaps 723, 727, 731, 735 can include at least partial folding at a respective fold line 725, 729, 733, 737.

The upper side panels 813 of the second blank 803 can then be folded downwardly relative to the flange panel 811 at the respective fold lines 815A-815Q to at least partially form the second portion 805 of the tray 710. In this regard, the upper side panels 813 can be positioned in at least partial face-to-face contact with respective upper marginal portions of the respective lower side panels 713, 717.

In such an arrangement, the upper side panels 813 can be positioned in at least partial face-to-face contact with the respective lower side panels 713, 717 to form respective sidewalls 865, 867, 869, 871 of the tray 710 that extend at least partially around an interior 707 of the tray 710. In some embodiments, respective side panels 713, 717, 813 can be adhered to one another with an adhesive such as glue. As shown, adjacent sidewalls of the plurality of sidewalls 865, 867, 869, 871 can be obliquely or perpendicularly arranged relative to one another.

Such configuration of the tray 710 provides a generally square or rectangular bottom profile that transitions along the sidewalls 865, 867, 869, 871 to a generally circular top profile.

In this regard, the upper side panels 813 can extend downwardly from the flange panel 811 of the upper portion 805, with the flange panel 811 forming a flange or reinforced flange 863 of the tray 710. As shown, the flange panel 811 extends outwardly away, e.g., away from the interior 707 of the tray 710, from the panels 713, 717, 813. The flange panel 811 can be arranged in generally spaced and parallel relation with the central panel 711.

The aforementioned positioning of the lower side panels 813, 817 and corner end flaps 723, 727, 731, 735 can at least partially overlie gaps, e.g., seams, between generally abutting or otherwise proximate respective adjacent side panels 713, 717, can provide at least partial resistance to leakage of fluid contents (e.g., dressings, condensation, runoff, etc.) associated with food products in the interior 707 of the tray 710.

Furthermore, the positioning of the side panels 713, 717 can provide reinforcement to the respective sidewalls 865, 867, 869, 871, e.g., such that a two-ply configuration is provided at such overlapping portions to avoid, for example, buckling, bowing, other unwanted deformation, etc.

In some embodiments, a composite and/or polymeric sheet of material such as liner L can be applied to one or more portions of the interior 707 of the tray 710, for example, to prevent leakage, to maintain one or more sanitary conditions of one or more food products held therein, to increase the longevity of the tray 710 in the presence of fluids, etc. In some embodiments, the secure engagement of the first portion 705 and the second portion 805 of the tray 710, can minimize, inhibit, prevent, and/or otherwise avoid inadvertent separation of a liner from the tray 710. In some embodiments, such liner L can at least partially maintain an engaged relationship between the first tray portion 705 and the second tray portion 805 of the tray 710. It will be understood that a liner can be applied to the blanks 703, 803 and/or the tray 710 formed therefrom in the manner described above with respect to the blanks 103, 203, 303, 403, 503, 603 and/or the trays 110, 310, 510 formed therefrom and as illustrated schematically in FIG. 3.

In some embodiments, it will be understood that the formed configuration of the tray 710 can be effected via one or more applications of an adhesive such as glue.

It will be understood that one or more features of the tray 710 can be alternatively arranged, dimensioned, and/or configured without departing from the disclosure.

Any of the features of the various embodiments of the disclosure can be combined with, replaced by, or otherwise configured with other features of other embodiments of the disclosure without departing from the scope of this disclosure. Further, it is noted that the nesting arrangements and/or the features of the blanks and cartons of the various embodiments can be incorporated into a carton or blank having any carton style or panel configuration. The carton styles and panel configurations described above are included by way of example.

The blanks according to any of the embodiments of the present disclosure can be, for example, formed from coated paperboard and similar materials. For example, the interior and/or exterior sides of the blank can be coated with a clay coating. The clay coating may then be printed over with product, advertising, price coding, and other information or images. The blank may then be coated with a varnish to protect any information printed on the blank. The blank may also be coated with, for example, a moisture barrier layer, on either or both sides of the blank. In accordance with the above-described embodiments, the blank may be constructed of paperboard of a caliper such that it is heavier and more rigid than ordinary paper. The blank can also be constructed of other materials, such as cardboard, hard paper, or any other material having properties suitable for enabling the carton to function at least generally as described herein. The blank can also be laminated or coated with one or more sheet-like materials at selected panels or panel sections.

In accordance with the above-described embodiments of the present disclosure, a fold line can be any substantially linear, although not necessarily straight, form of weakening that facilitates folding therealong. More specifically, but not for the purpose of narrowing the scope of the present disclosure, fold lines include: a score line, such as lines formed with a blunt scoring knife, or the like, which creates a crushed portion in the material along the desired line of weakness; a cut that extends partially into a material along the desired line of weakness, and/or a series of cuts that extend partially into and/or completely through the material along the desired line of weakness; and various combinations of these features.

As an example, a tear line can include: a slit that extends partially into the material along the desired line of weakness, and/or a series of spaced apart slits that extend partially into and/or completely through the material along the desired line of weakness, or various combinations of these features. As a more specific example, one type of tear line is in the form of a series of spaced apart slits that extend completely through the material, with adjacent slits being spaced apart slightly so that a nick (e.g., a small somewhat bridging-like piece of the material) is defined between the adjacent slits for typically temporarily connecting the material across the tear line. The nicks are broken during tearing along the tear line. The nicks typically are a relatively small percentage of the tear line, and alternatively the nicks can be omitted from or torn in a tear line such that the tear line is a continuous cut line. That is, it is within the scope of the present disclosure for each of the tear lines to be replaced with a continuous slit, or the like. For example, a cut line can be a continuous slit or could be wider than a slit without departing from the present disclosure.

The above embodiments may be described as having one or more panels adhered together by glue during erection of the carton embodiments. The term "glue" is intended to encompass all manner of adhesives commonly used to secure carton panels in place.

The foregoing description of the disclosure illustrates and describes various exemplary embodiments. Various additions, modifications, changes, etc., could be made to the exemplary embodiments without departing from the spirit and scope of the disclosure. It is intended that all matter contained in the above description or shown in the accompanying drawings shall be interpreted as illustrative and not in a limiting sense. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A tray for holding one or more food products, the tray comprising:
    a first portion comprising a plurality of panels comprising a central panel and a plurality of lower side panels each foldably connected to the central panel wherein each lower side panel of the plurality of lower side panels is at least partially curved; and
    a second portion engaged with the first portion, the second portion comprising a plurality of panels comprising a flange panel and a plurality of upper side panels each foldably connected to the flange panel,
    the plurality of upper side panels and the plurality of lower side panels are attached to form a plurality of sidewalls of the tray.

2. The tray of claim 1, wherein the first portion of the tray is a base portion of the tray and the second portion of the tray is a crown portion of the tray positioned above the base portion of the tray.

3. The tray of claim 2, wherein the flange panel extends at least partially around a central opening, the plurality of upper side panels extending into the central opening.

4. The tray of claim 3, wherein the flange panel has an outer perimeter length greater than that of the outer perimeter of the central panel.

5. The tray of claim 3, wherein adjacent sidewalls of the plurality of sidewalls are obliquely arranged.

6. The tray of claim 3, wherein a respective upper side panel of the plurality of upper side panels is adhered to a respective lower side panel of the plurality of lower side panels.

7. The tray of claim 3, wherein the flange panel extends away from the plurality of upper side panels and the plurality of lower side panels to form a reinforced flange of the tray.

8. The tray of claim 7, wherein each lower side panel of the plurality of lower side panels comprises a respective base portion foldably connected to the central panel and a respective distal portion foldably connected to the respective base portion.

9. The tray of claim 8, wherein the respective distal portion of each lower side panel of the plurality of lower side panels is positioned in at least partial face-to-face contact with the flange panel to at least partially form the reinforced flange of the tray.

10. The tray of claim 7, wherein the first portion of the tray further comprises a plurality of corner end flaps foldably connected to a respective lower side panel of the plurality of lower side panels.

11. The tray of claim 10, wherein a respective corner end flap is positioned in at least partial face-to-face contact with a portion of a respective lower side panel of the plurality of lower side panels to form a respective sidewall of the plurality of sidewalls of the tray.

12. The tray of claim 1, wherein the central panel has a square configuration.

13. A combination of blanks for forming a tray for holding one or more food products, the combination comprising:
    a first blank comprising a plurality of panels comprising a central panel and a plurality of lower side panels each foldably connected to the central panel, wherein each lower side panel of the plurality of lower side panels is at least partially curved when the tray is formed from the combination of blanks; and
    a second blank for being engaged with the first blank when the tray is formed from the combination of blanks, the second blank comprising a plurality of panels comprising a flange panel and a plurality of upper side panels each foldably connected to the flange panel,
    the plurality of upper side panels and the plurality of lower side panels are for being attached to form a plurality of sidewalls of the tray formed from the combination of blanks.

14. The combination of claim 13, wherein the flange panel extends at least partially around a central opening, the plurality of upper side panels extending into the central opening.

15. The combination of claim 14, wherein the flange panel has an outer perimeter length greater than that of the outer perimeter of the central panel.

16. The combination of claim 14, wherein the plurality of upper side panels and the plurality of lower side panels are for being attached to form a plurality of sidewalls of the tray formed from the combination of blanks such that adjacent sidewalls of the plurality of sidewalls are obliquely arranged.

17. The combination of claim 14, wherein the flange panel extends away from the plurality of upper side panels for forming a reinforced flange of the tray formed from the combination of blanks.

18. The combination of claim 17, wherein each lower side panel of the plurality of lower side panels comprises a respective base portion foldably connected to the central panel and a respective distal portion foldably connected to the respective base portion.

19. The combination of claim 18, wherein the respective distal portion of each lower side panel of the plurality of lower side panels is for being positioned in at least partial face-to-face contact with the flange panel to at least partially form the reinforced flange of the tray formed from the combination of blanks.

20. The combination of claim 17, wherein the first blank further comprises a plurality of corner end flaps foldably connected to a respective lower side panel of the plurality of lower side panels.

21. The combination of claim 20, wherein a respective corner end flap is for being positioned in at least partial face-to-face contact with a portion of a respective lower side panel of the plurality of lower side panels to form a respective sidewall of the plurality of sidewalls of the tray formed from the combination of blanks.

22. The combination of claim 13, wherein the central panel has a square configuration.

23. A method of forming a tray for holding one or more food products, the method comprising:
obtaining a first blank, the first blank comprising a plurality of panels comprising a central panel and a plurality of lower side panels each foldably connected to the central panel; and
obtaining a second blank, the second blank comprising a plurality of panels comprising a flange panel and a plurality of upper side panels each foldably connected to the flange panel;
forming a first portion of the tray from the first blank and at least partially curving each lower side panel of the plurality of lower side panels;
forming a second portion of the tray from the first blank; and attaching the plurality of upper side panels and the plurality of lower side panels to form a plurality of sidewalls of the tray.

24. The method of claim 23, wherein the first portion of the tray is a base portion of the tray and the second portion of the tray is a crown portion of the tray positioned above the base portion of the tray.

25. The method of claim 24, wherein the flange panel extends at least partially around a central opening, the plurality of upper side panels extending into the central opening.

26. The method of claim 25, wherein the flange panel has an outer perimeter length greater than that of the outer perimeter of the central panel.

27. The method of claim 25, wherein adjacent sidewalls of the plurality of sidewalls are obliquely arranged.

28. The method of claim 25, further comprising adhering a respective upper side panel of the plurality of upper side panels to a respective lower side panel of the plurality of lower side panels.

29. The method of claim 25, further comprising positioning the flange panel extending away from the plurality of upper side panels and the plurality of lower side panels to form a reinforced flange of the tray.

30. The method of claim 29, wherein each lower side panel of the plurality of lower side panels comprises a respective base portion foldably connected to the central panel and a respective distal portion foldably connected to the respective base portion.

31. The method of claim 30, further comprising positioning the respective distal portion of each lower side panel of the plurality of lower side panels in at least partial face-to-face contact with the flange panel to at least partially form the reinforced flange of the tray.

32. The method of claim 29, wherein the first blank further comprises a plurality of corner end flaps foldably connected to a respective lower side panel of the plurality of lower side panels.

33. The method of claim 32, further comprising positioning a respective corner end flap is positioned in at least partial face-to-face contact with a portion of a respective lower side panel of the plurality of lower side panels to form a respective sidewall of the plurality of sidewalls of the tray.

34. The method of claim 23, wherein the central panel has a square configuration.

\* \* \* \* \*